United States Patent
Krumpe

(10) Patent No.: US 9,596,877 B2
(45) Date of Patent: Mar. 21, 2017

(54) FOOD PREPARATION DEVICE AND METHOD OF PREPARING FOOD

(71) Applicant: Y Line Product Design LLC, Chicago, IL (US)

(72) Inventor: Geraint Godfellow Krumpe, Chicago, IL (US)

(*) Notice: Subject to any disclaimer, the term of this patent is extended or adjusted under 35 U.S.C. 154(b) by 0 days.

(21) Appl. No.: 14/450,680

(22) Filed: Aug. 4, 2014

(65) Prior Publication Data

US 2015/0037481 A1 Feb. 5, 2015

Related U.S. Application Data

(60) Provisional application No. 61/862,266, filed on Aug. 5, 2013.

(51) Int. Cl.
*A23L 15/00* (2016.01)
*A23L 1/32* (2006.01)
*A47J 43/10* (2006.01)

(52) U.S. Cl.
CPC ...... *A23L 1/32* (2013.01); *A23L 5/00* (2016.08); *A23L 15/00* (2016.08); *A47J 43/105* (2013.01)

(58) Field of Classification Search
CPC .. A47J 43/10; A47J 43/105; A23J 1/09; A23L 1/32; A23L 5/00; A23L 15/00
USPC ... 366/218, 215, 129; 99/440, 497, 500, 484
See application file for complete search history.

(56) References Cited

U.S. PATENT DOCUMENTS

| | | | |
|---|---|---|---|
| 4,189,862 A * | 2/1980 | Lopez | 446/254 |
| 8,263,166 B2 * | 9/2012 | Gurner | A23L 15/00 426/519 |
| 2010/0083847 A1* | 4/2010 | Kirschbaum | A47J 43/24 99/485 |

FOREIGN PATENT DOCUMENTS

GB 2342869 4/2000

OTHER PUBLICATIONS

Spinner Guy. "How to scramble eggs in the shell." YouTube Apr. 3, 2013 [retrieved on Oct. 18, 2014]. Retrieved from the internet: <URL:http://www.youtube.com/watch?v=nDmfnVpPg.; entire video.
International Search Report—mailing date Nov. 28, 2014—3 pages.
Written Opinion—mailing date Nov. 28, 2014—4 pages.
Youtube video illustrating use of a device to be disclosed.

* cited by examiner

*Primary Examiner* — Tony G Soohoo
*Assistant Examiner* — Anshu Bhatia
(74) *Attorney, Agent, or Firm* — Sala Skokos; Skokos Law Group LLC

(57) ABSTRACT

Methods and apparatuses for mixing food are disclosed. In an embodiment, a mixing device includes a housing including a cavity configured to hold an item and at least one cord attached to the housing. The at least one cord is configured to cause the housing to rotate when the at least one cord is pulled in a direction away from the housing. In another embodiment, a method of mixing includes placing an item inside of a housing, rotating the housing in a first direction to create tension, and releasing the tension so that the housing rotates in a second direction and mixes the item.

13 Claims, 30 Drawing Sheets

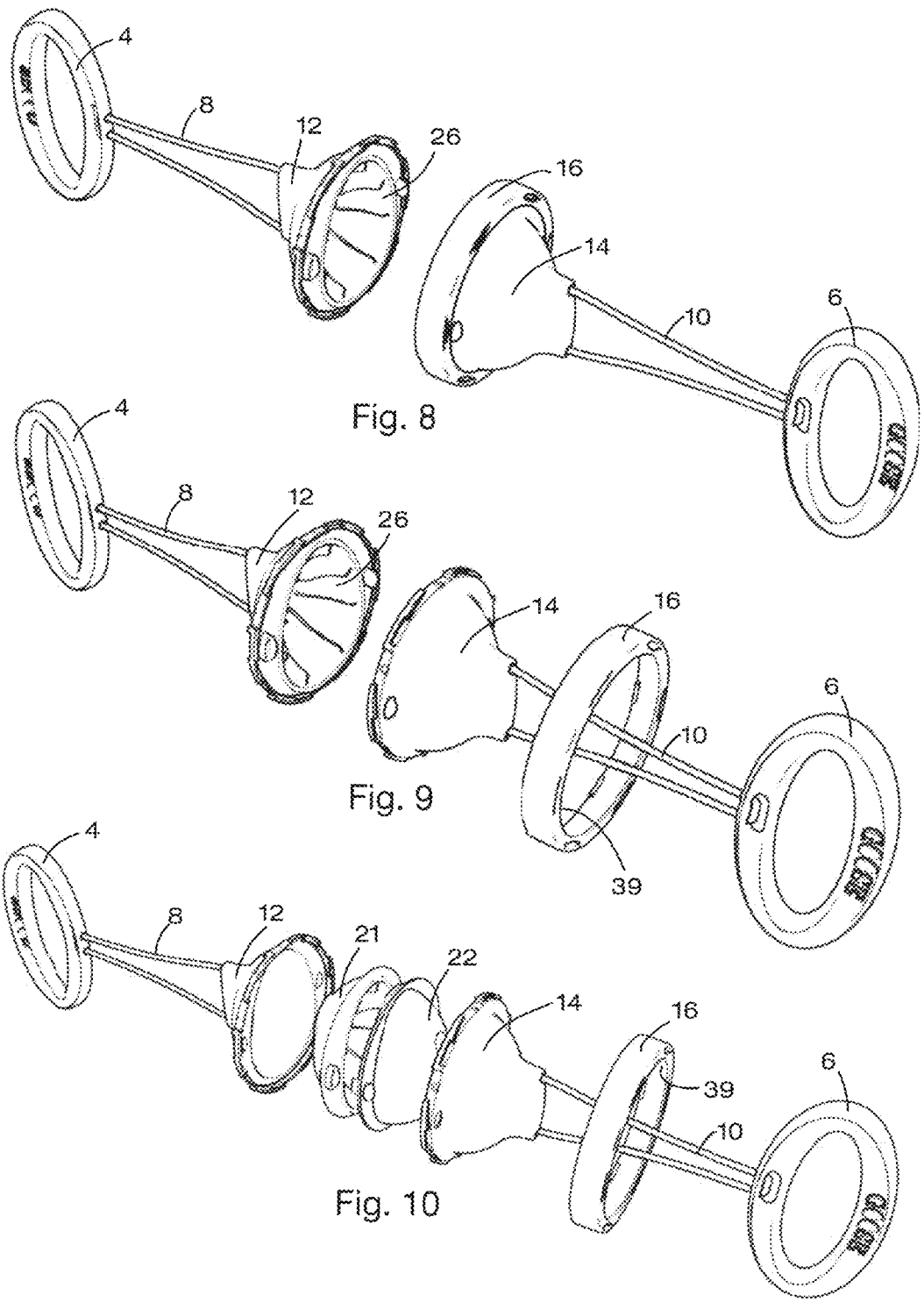

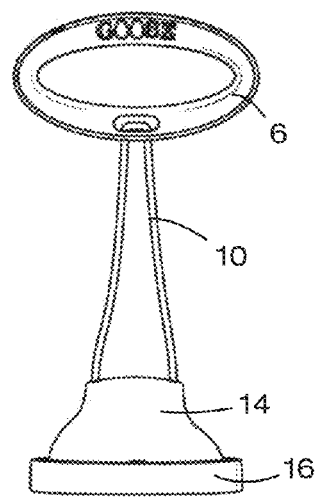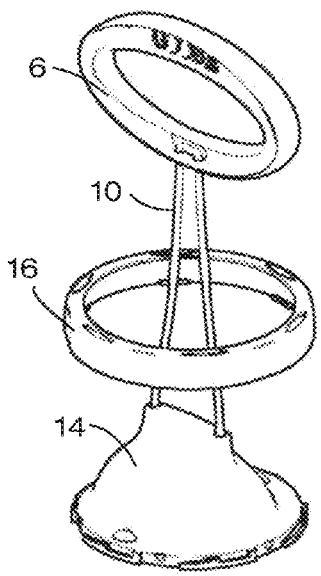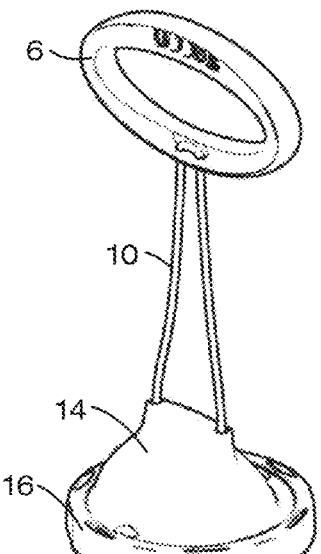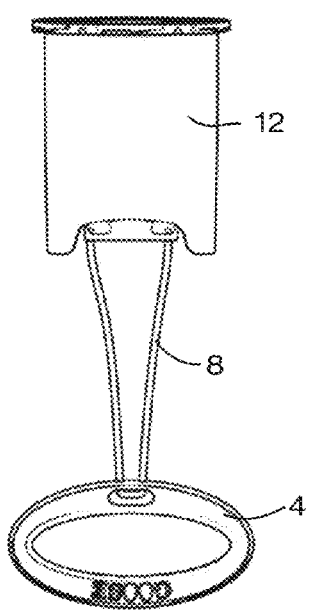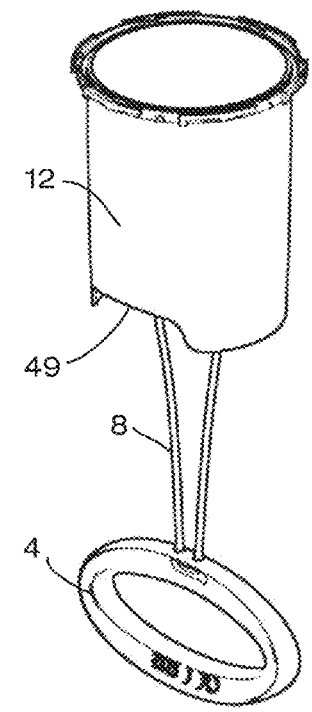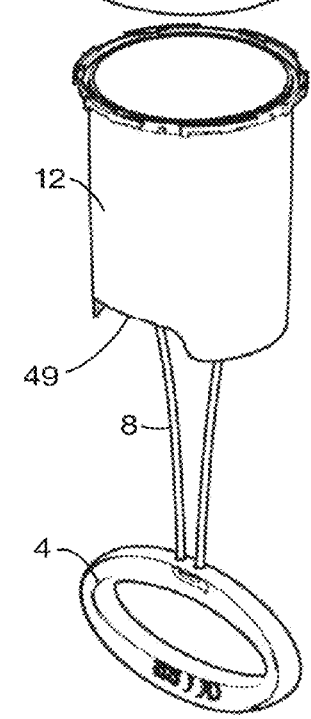
Fig. 18 c　　　　　Fig. 18 d　　　　　Fig. 18 e

FOOD PREPARATION DEVICE AND METHOD OF PREPARING FOOD

CROSS REFERENCE TO RELATED APPLICATIONS

This application claims priority to and the benefit of U.S. Provisional Application No. 61/862,266, filed Aug. 5, 2013, the entire content of which is hereby incorporated by reference.

FIELD OF THE INVENTION

The present disclosure relates generally to methods and apparatuses for mixing food and/or non-food products, and more specifically to mixing food such as, for example, eggs, salads, salad dressings and cocktails.

BACKGROUND

Different food products often need to be mixed to prepare a meal. Typically, this process involves using a wire whisk or a mixing beater to stir the food products, or shaking up different food products in a closed container. This process, however, can be time consuming and/or tiring for the user if manually performed by the user, and automatic mixing products are typically large and bulky.

Eggs, for example, are often mixed to prepare a meal. Several desirable egg dishes involve mixing the white and yolk of the egg. Devices have been proposed to mix the white and yolk of an egg within the egg, but these devices are often complex or involve piercing or breaking the egg's shell to perform the mixing.

There is therefore a need in the art for a simple and compact device that allows a user to mix food and/or non-food products in a fast and efficient manner. With respect to eggs in particular, there is a need in the art for a simple device that can mix the white and yolk of an egg without a user having to pierce or break the egg's shell.

SUMMARY

The present disclosure provides methods and apparatuses for mixing food products and/or non-food products. More specifically, the present disclosure provides methods and apparatuses for mixing food products and/or non-food products using manually created rotational forces. In an embodiment, the contents of an egg can be scrambled without penetration of the egg's natural shell, so that the white and yolk of the egg can be scrambled internal to the unbroken egg shell. In another embodiment, the methods and apparatuses disclosed herein can be used to mix fluid and semi-fluid ingredients such as ingredients for salads, salad dressings or cocktails. The methods and apparatuses disclosed herein can also be used to mix multiple eggs at once, and/or to centrifuge and separate liquids from solids using the manually created rotational forces.

The mixing device disclosed herein also allows for a plurality of parts to be interchanged and/or added to the mixing device so that different food products and/or non-food products can be mixed by the same compact mixing device.

In a general embodiment, a mixing device includes a housing including a cavity configured to hold an item and at least one cord attached to the housing. The at least one cord is configured to cause the housing to rotate when the at least one cord is pulled in a direction away from the housing.

In another embodiment, the housing is configured to be rotated in a first direction to place tension on the cord, and the at least one cord causes the housing to rotate in a second direction opposite the first direction when the cord is pulled in the direction away from the housing.

In another embodiment, the housing is rotated about an axis in the direction that the at least one cord is pulled.

In another embodiment, the item is at least one fluid, semi-fluid or solid, and rotation of the housing causes at least one of: (i) a single item to change a physical property; (ii) two or more items to be mixed together; or (iii) two or more items to be separated.

In another embodiment, the item is at least one of an egg or a food container.

In another embodiment, the housing includes a first outer shell and a second outer shell, and the first outer shell is configured to attach to the second outer shell around the item.

In another embodiment, the housing includes at least one inner shell including a cavity that is an approximate shape of the item.

In another embodiment, the at least one cord is two cords attached to opposite sides of the housing, and the housing is configured to rotate when the two cords are pulled in opposite directions away from the housing.

In a general embodiment, a mixing device includes a first side including a first outer shell and a first cord attached to the first outer shell, a second side including a second outer shell and a second cord attached to the second outer shell, and an attachment mechanism for attaching the first outer shell to the second outer shell. The first outer shell and the second outer shell are configured to rotate when the first cord and the second cord are pulled in opposite directions away from the first outer shell and the second outer shell.

In another embodiment, the attachment mechanism is formed as part of at least one of the first outer shell and the second outer shell.

In another embodiment, the first outer shell and the second outer shell are configured to rotate about an axis defined by the opposite pulling directions of the first cord and the second cord.

In another embodiment, at least one of the first side and the second side includes an inner shell with a cavity that is an approximate shape of an item to be placed inside the cavity.

In another embodiment, the mixing device includes a plurality of interchangeable inner shells that can be removeably attached to at least one of the first outer shell and the second outer shell.

In a general embodiment, a method of mixing food includes placing an item inside of a housing, rotating the housing in a first direction to create tension, and releasing the tension so that the housing rotates in a second direction and mixes the item.

In another embodiment, rotating the housing in the first direction includes twisting at least one cord attached to the housing to create the tension.

In another embodiment, releasing the tension includes pulling the at least one cord in a direction away from the housing.

In another embodiment, releasing the tension includes rotating the housing in the second direction about an axis in the direction that the at least one cord is pulled away from the housing.

In another embodiment, releasing the tension includes pulling two cords in opposite directions away from the housing.

In another embodiment, releasing the tension includes rotating the housing in the second direction opposite the first direction.

In another embodiment, placing the item inside of the housing includes attaching a first shell of the housing and a second shell of the housing around the item.

An advantage of the present disclosure is that a variety of different food products and non-food products can be mixed with a simple, compact mixing device.

An advantage of the present disclosure is that a variety of parts can be interchanged and/or added to the mixing device so that different food products and/or non-food products can be mixed by the same compact mixing device.

An advantage of the present disclosure is that various drinks can be quickly and easily mixed with a simple, compact mixing device.

An advantage of the present disclosure is that solids and liquids can be mixed together, for example by infusion, or mixed apart, for example by centrifusion or extraction, using a simple, compact mixing device.

BRIEF DESCRIPTION OF THE FIGURES

Embodiments of the present disclosure will now be explained in further detail by way of example only with reference to the accompanying figures, in which:

FIG. 8 depicts a top perspective view of the mixing device of FIG. 1;

FIG. 9 depicts a top perspective view of the mixing device of FIG. 1;

FIG. 10 depicts a top perspective view of the mixing device of FIG. 1;

FIG. 18a depicts a side view of an alternative embodiment of the mixing device of FIG. 1;

FIG. 18b depicts a side perspective view of the mixing device of FIG. 18a;

FIG. 18c depicts a side view of the mixing device of FIG. 18a;

FIG. 18d depicts a side perspective view of the mixing device of FIG. 18a;

FIG. 18e depicts a side perspective view of the mixing device of FIG. 18a;

FIG. 18f depicts a side perspective view of the mixing device of FIG. 18a;

FIG. 18g depicts a side perspective view of the mixing device of FIG. 18a;

FIG. 22a depicts a top perspective view of an embodiment of a mixing device according to the present disclosure;

FIG. 22b depicts a top view of the mixing device of FIG. 22a;

FIG. 22c depicts a side view of the mixing device of FIG. 22a;

FIG. 23 depicts a side perspective view of the mixing device of FIG. 22a;

FIGS. 24a to 24e depict the use of the mixing device of FIG. 22a;

FIGS. 25a to 25f depict the use of the mixing device of FIG. 22a;

FIG. 26a depicts a side perspective view of an alternative embodiment of the mixing device of FIG. 22a;

FIG. 26b depicts a side perspective view of an alternative embodiment of the mixing device of FIG. 22a;

FIG. 26c depicts a side perspective view of an alternative embodiment of the mixing device of FIG. 22a;

FIG. 27a depicts a top perspective view of an embodiment of a mixing device according to the present disclosure;

FIG. 27b depicts a side view of the mixing device of FIG. 27a;

FIG. 27c depicts a top view of the mixing device of FIG. 27a;

FIG. 28a depicts a top perspective view of the mixing device of FIG. 27a;

FIG. 28b depicts a side view of the mixing device of FIG. 27a;

FIG. 28c depicts example locking mechanisms to be used with the mixing devices of the present disclosure;

FIG. 29a depicts a top perspective view of an embodiment of a mixing device according to the present disclosure;

FIG. 29b depicts a top view of the mixing device of FIG. 29a;

FIG. 29c depicts a side view of the mixing device of FIG. 29a;

FIG. 30a depicts a top perspective view of the mixing device of FIG. 29a;

FIG. 30b depicts a top view of the mixing device of FIG. 29a;

FIG. 30c depicts a side view of the mixing device of FIG. 29a;

FIG. 31 depicts a top perspective view of the mixing device of FIG. 29a;

FIG. 32a depicts a top perspective view of the mixing device of FIG. 29a;

FIG. 32b depicts a top view of the mixing device of FIG. 29a;

FIG. 32c depicts a side view of the mixing device of FIG. 29a;

FIG. 33a depicts a top perspective view of an alternative embodiment of the mixing device of FIG. 27a;

FIG. 33b depicts a side perspective view of an alternative embodiment of the mixing device of FIG. 27a;

FIG. 33c depicts a side perspective view of the mixing device of FIG. 27a;

DETAILED DESCRIPTION

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

The present disclosure relates to a method and apparatus for mixing food products and/or non-food products using manually created rotational forces. Although the present disclosure is described with reference to mixing food products, the skilled artisan will understand that the disclosure can be applied to other products that must be mixed as well. As used herein, a "mixing item" refers to any fluid, semi-fluid or non-fluid food or non-food product that can be mixed, such as for example, an egg, a mixing container which contains contents to be mixed, or the contents to be mixed themselves. As used herein, "mixing" refers to any of (i) mixing a single mixing item to change a physical property, for example the consistency, of the single mixing item, (ii) "mixing together" two or more mixing items, for example infusing one mixing item with another mixing item, and (iii) "mixing apart" two or more mixing items, for example separating one mixing item from another mixing item by centrifusion or extracting one mixing item from another mixing item.

Figure 1:
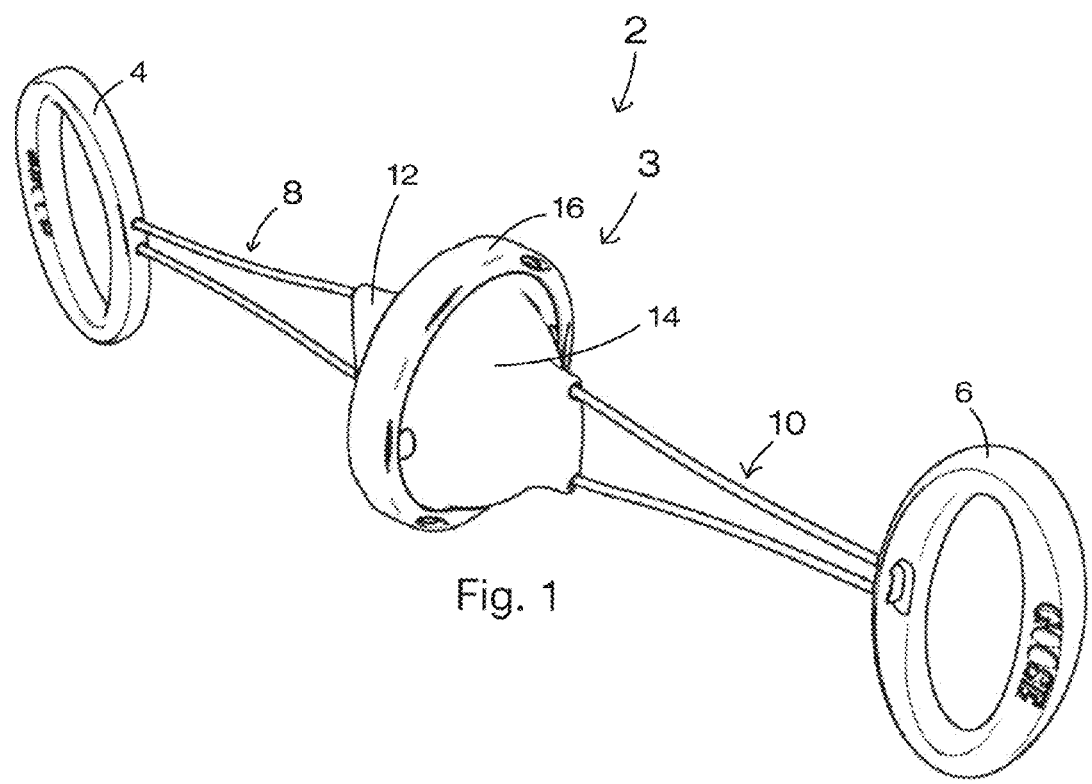
FIG. 1 depicts a top perspective view of an embodiment of a mixing device according to the present disclosure.
Figure 2:
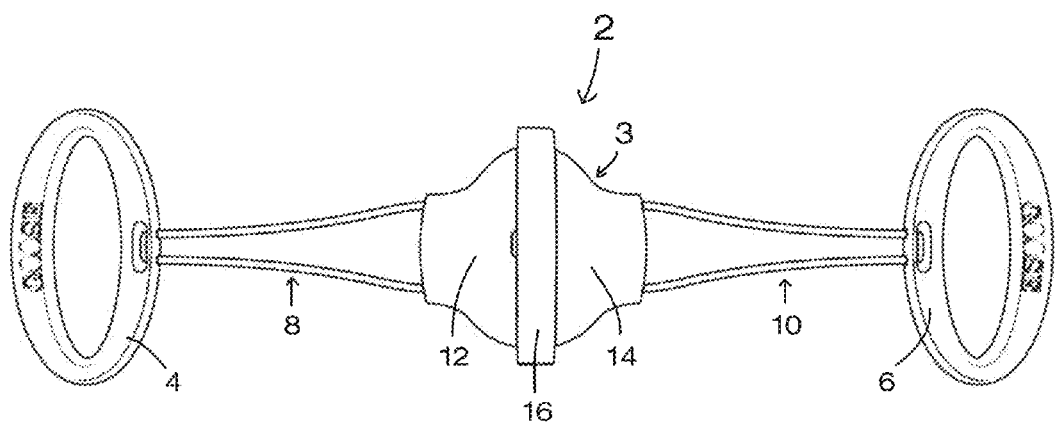
FIG. 2 depicts a side view of the mixing device of FIG. 1.
Figure 3:
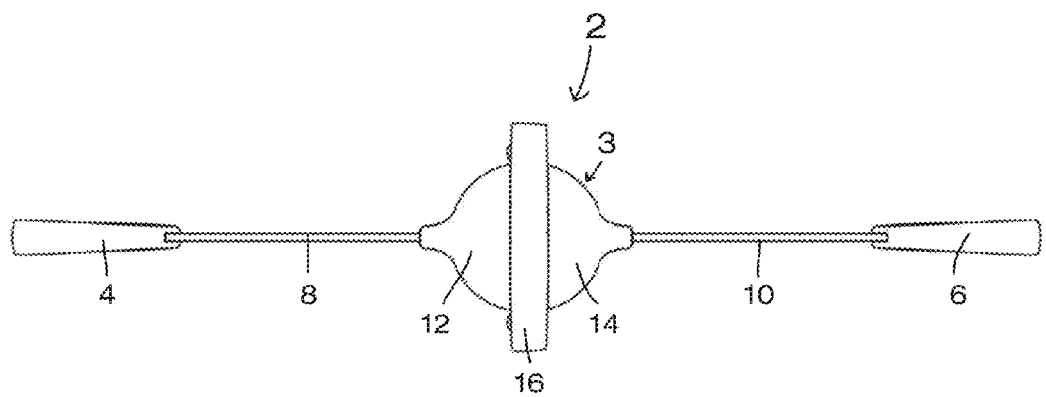
FIG. 3 depicts a top view of the mixing device of FIG. 1.

FIGS. 1 to 21 illustrate an example embodiment of a mixing device 2 according to the present disclosure. As shown in FIGS. 1 to 3, mixing device 2 includes a housing 3, a first handle 4, a second handle 6, a first cord 8 and a second cord 10. In use, and as explained in more detail below, one or more mixing items can be placed inside housing 3, and housing 3 can be rotated about an axis that extends from first handle 4 to second handle 6 so that the one or more mixing items placed inside housing 3 are mixed by the rotation of housing 3. In an embodiment, the handles 4, 6 can be held out to the side of mixing device 2, as shown in FIG. 2, and housing 3 can be rotated about an approximately horizontal axis extending from first handle 4 to second handle 6.

In the illustrated embodiment, housing 3 includes a first outer shell 12, a second outer shell 14 and an attachment mechanism 16. Attachment mechanism 16 is used to fasten first outer shell 12 and second outer shell 14 together, and is described in more detail below. FIGS. 1 to 3 show mixing device 2 in a mixing configuration, in which first outer shell 12 and second outer shell 14 are fastened around a mixing item, for example an egg, a mixing container which contains contents to be mixed, or the contents to be mixed themselves. In the mixing configuration, mixing device is ready for housing 3 to be rotated to mix the mixing item or the contents thereof. In a preferred embodiment, an egg is placed inside housing 3, and the white and yolk of the egg are mixed together by the use of mixing device 2, as described below.

Figure 4:
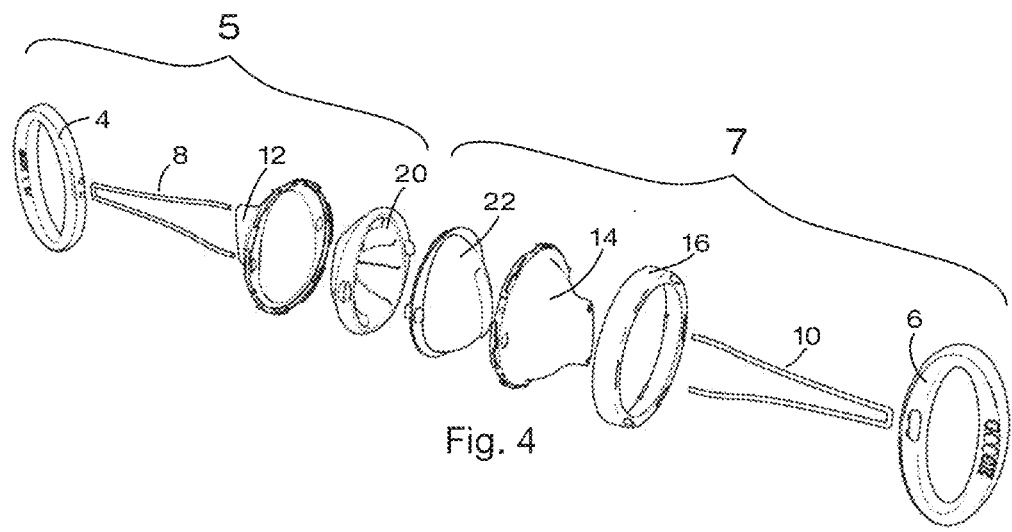
FIG. 4 depicts an exploded perspective view of the mixing device of FIG. 1.
Figure 5:
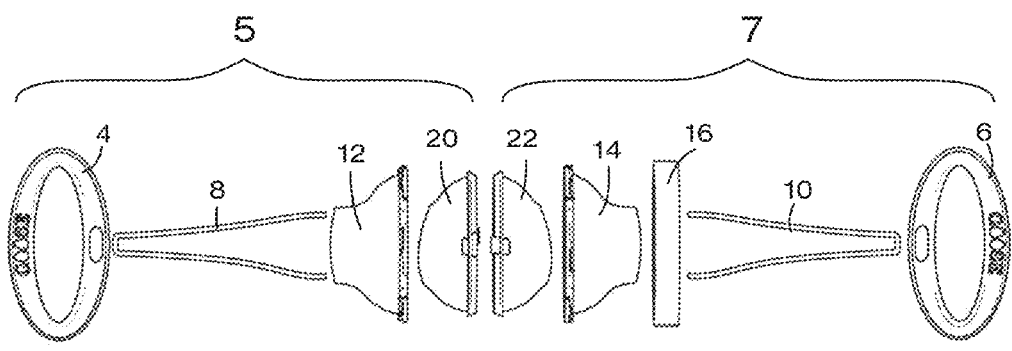
FIG. 5 depicts an exploded side view of the mixing device of FIG. 1.

FIGS. 4 and 5 show exploded views of mixing device 2. In the illustrated embodiment, mixing device 2 includes a first inner shell 20 and a second inner shell 22. An alternative way to describe mixing device 2 is to describe the components of first inner shell 20, first outer shell 12, first cord 8 and first handle 4 as a first side 5 of mixing device 2, and the components of second inner shell 22, second outer shell 14, second cord 10 and second handle 6 as a second side 7 of mixing device 2. Attachment mechanism 16 can be disposed on either or both of first side 5 and second side 7.

In an embodiment, first inner shell 20 removeably attaches to first outer shell 12, and second inner shell 22 removeably attaches to second outer shell 14. Alternatively, first inner shell 20 and first outer shell 12 can be integrally formed as one piece, and/or second inner shell 22 and second outer shell 14 can be integrally formed as one piece. An advantage of forming the respective inner and outer shells as separate pieces is that various different inner shells can be removeably attached to the respective outer shells to accommodate different mixing items, as described in more detail below. FIG. 10 shows first inner shell 20 and second inner shell 22 removed from first outer shell 12 and second outer shell 14, respectively.

Figure 6:
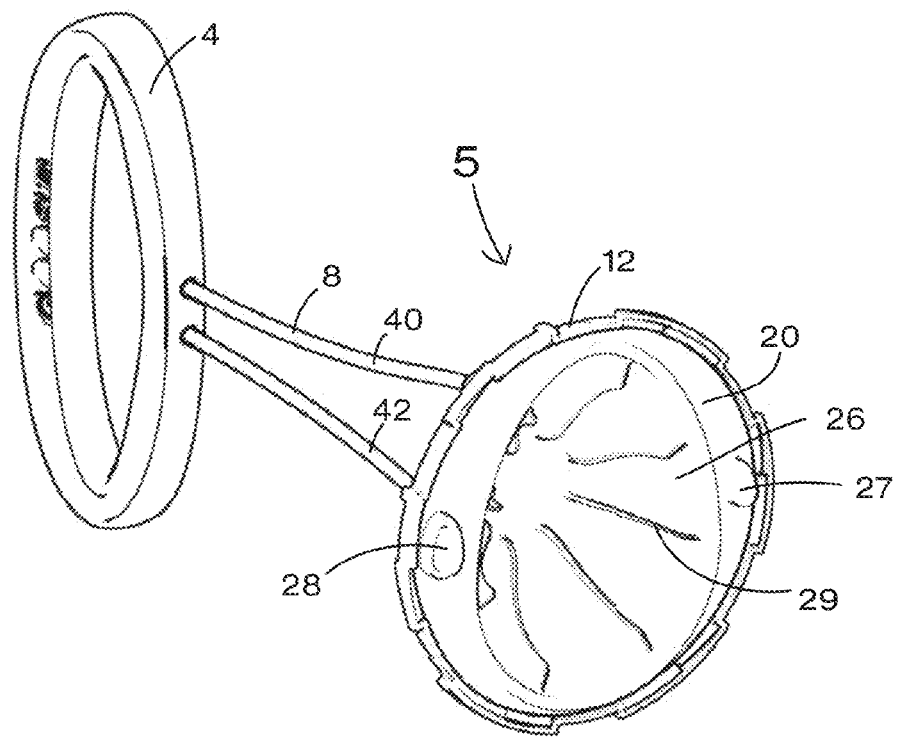
FIG. 6 depicts a detailed perspective view of a first side of the mixing device of FIG. 1.
Figure 7:
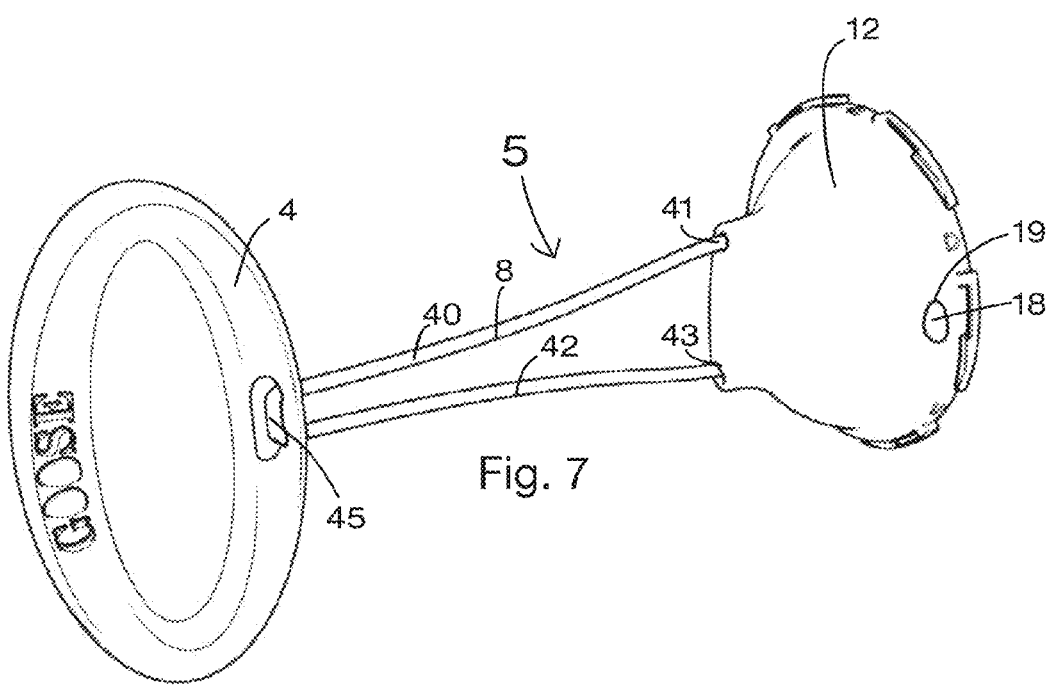
FIG. 7 depicts a detailed perspective view of the first side of the mixing device of FIG. 1.

FIGS. 6 and 7 show a detailed view of first side 5 including first inner shell 20 and first outer shell 12. In the embodiment shown, first inner shell 20 and first outer shell 12 are attached by projections 18 formed on first inner shell 20 that project into apertures 19 formed on first outer shell 12. The projections 18 and/or apertures 19 can be formed on either or both of first outer shell 12 and/or first inner shell 20. Alternatively, one of ordinary skill in the art will appreciate other methods of removeably attaching first inner shell 20 to first outer shell 12. Second inner shell 22 and second outer shell 14 can be attached in the same way.

First inner shell 20 includes a male mating feature 27 and a female mating feature 28. Second inner shell 22 also includes a corresponding male mating feature 27 and a corresponding female mating feature 28. The mating features help to align first inner shell 20 and second inner shell 22 and to prevent the inner shells from rotating while the attachment mechanism is applied and while the mixing device is in use. The male mating feature 27 of first inner shell 20 can be matched up and mated with the female mating feature 28 of second inner shell 22, and the female mating feature 28 of first inner shell 20 can be matched up and mated with the male mating feature 27 of second inner shell 22. In the embodiment shown, male mating feature 27 is a protrusion on one side of each of the inner shells, and female mating feature 28 is a cavity on the other side of each of the inner shells that is configured to mate with the corresponding male mating feature 27, but those of ordinary skill in the art will recognize other configurations and types of mating features for mating first inner shell 20 to second inner shell 22.

First outer shell 12 and second outer shell 14 are preferably formed of a durable, rigid material such as plastic. The rigidity of the outer shells aids in the functionality of mixing device 2 with the cords 8, 10, prevents the outer shells 12, 14 from flexing during rotation, and dampens the effect of the cords. In a preferred embodiment, first outer shell 12 and second outer shell 14 are formed of acrylonitrile butadiene styrene, or ABS plastic. In another embodiment, first outer shell 12 and second outer shell 14 are formed of polypropylene. Those of ordinary skill in the art will recognize similar suitable materials.

First inner shell 20 and second inner shell 22 are preferably formed of a soft material such as silicone rubber. In an embodiment, first inner shell 20 and second inner shell 22 should be made of a tough, resistant material that is safe to contact food and dishwasher safe. The silicone rubber inner shells can also act as a mechanism for locking housing 3 together, as explained in more detail below. Those of ordinary skill in the art will recognize other food-grade elastomers suitable to use for first inner shell 20 and second inner shell 22.

First inner shell 20 and second inner shell 22 each include a mold 26, as shown in detail in FIG. 6. In the illustrated embodiment, mold 26 is shaped to hold a mixing item, which here is a standard egg or egg-shaped contained. Mold 26 includes a chamber for the mixing item to be placed and projections 29 to hold the mixing item in place. Projections 29 can flex as a mixing item is inserted into mold 26 to accommodate eggs and containers of different shapes and sizes and to prevent the eggs and containers from rotating inside mold 26. In the illustrated embodiment, mold 26 of second inner shell 22 is the image of mold 26 of first inner shell 20 rotated by 180 degrees, but one of ordinary skill in the art may wish to make the molds mirror images or different shapes altogether to secure different types of mixing items. Alternatively, first inner shell 20 and/or second inner shell 22 can be formed of a foam material that will conform to different sized mixing items placed between the inner shells.

In the illustrated embodiment, the chamber of mold 26 is shaped to hold an egg so that the axis passing through the egg from the top to the bottom (i.e., so that the egg is symmetrical about the axis) is orthogonal to the axis that extends from first handle 4 to second handle 6. The orthogonal axis allows for faster, more efficient mixing of an egg or similarly shaped container because there are more points of contact as the mixing item rotates, and there is a greater force and momentum because the mass of the mixing item is extended from its center of rotation.

FIGS. 8 and 9 show mixing device 2 in a loading configuration, in which first outer shell 12 and second outer shell 14 have been detached so that the mixing item, for example an egg or egg-shaped container, can be placed between first inner shell 20 and second inner shell 22. In the illustrated embodiment of FIG. 9, attachment device 16 can be slid away from first outer shell 12 and second outer shell 14 during placement of the mixing item. Alternatively, attachment device 16 can be formed as part of first outer shell 12 or second outer shell 14 so that one of first outer shell 12 and second outer shell 14 can simply be twisted, screwed, clamped, or the like, to the other of first outer shell 12 and second outer shell 14.

Figure 11:
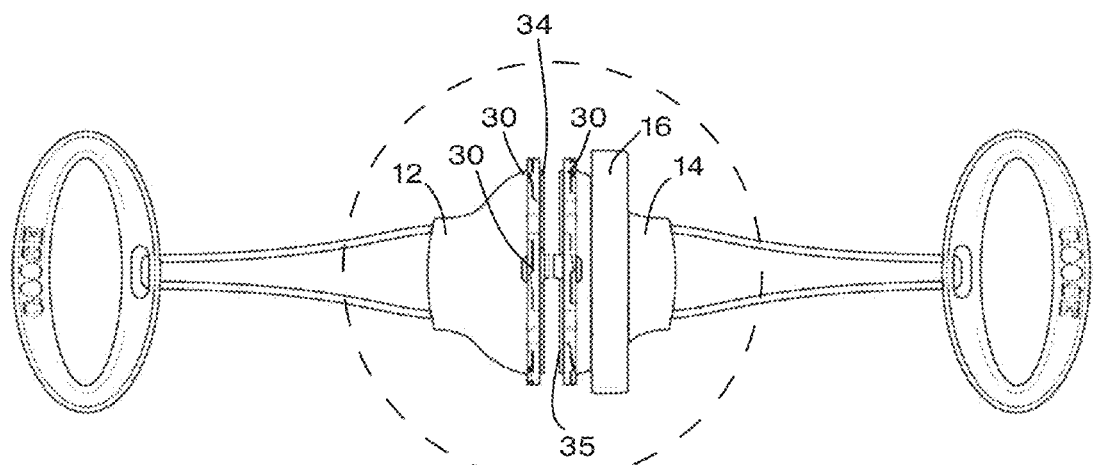
FIG. 11 depicts a side view of the mixing device of FIG. 1.
Figure 12:
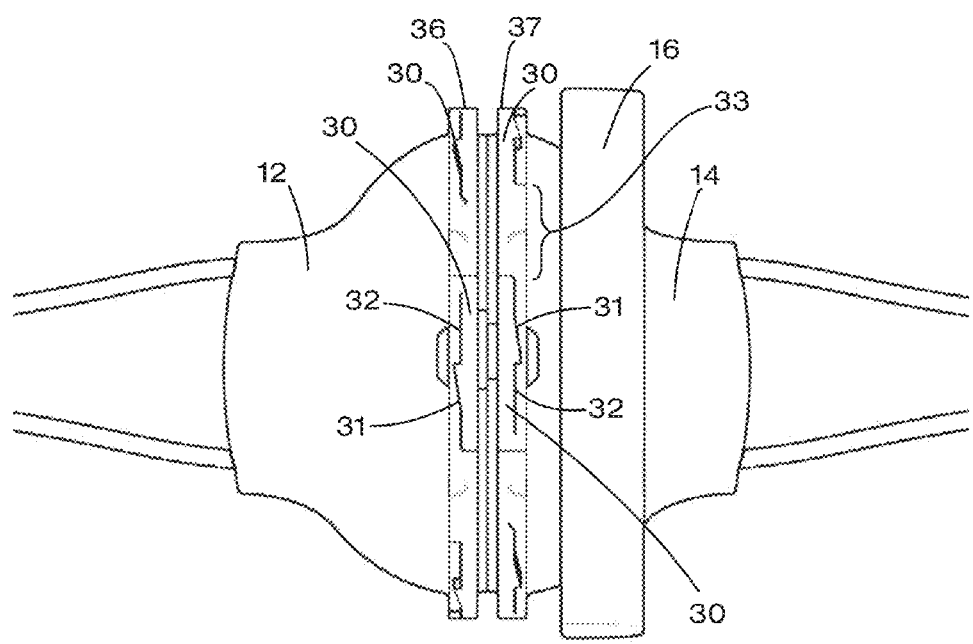
FIG. 12 depicts a detailed view of the mixing device of FIG. 1.
Figure 13:
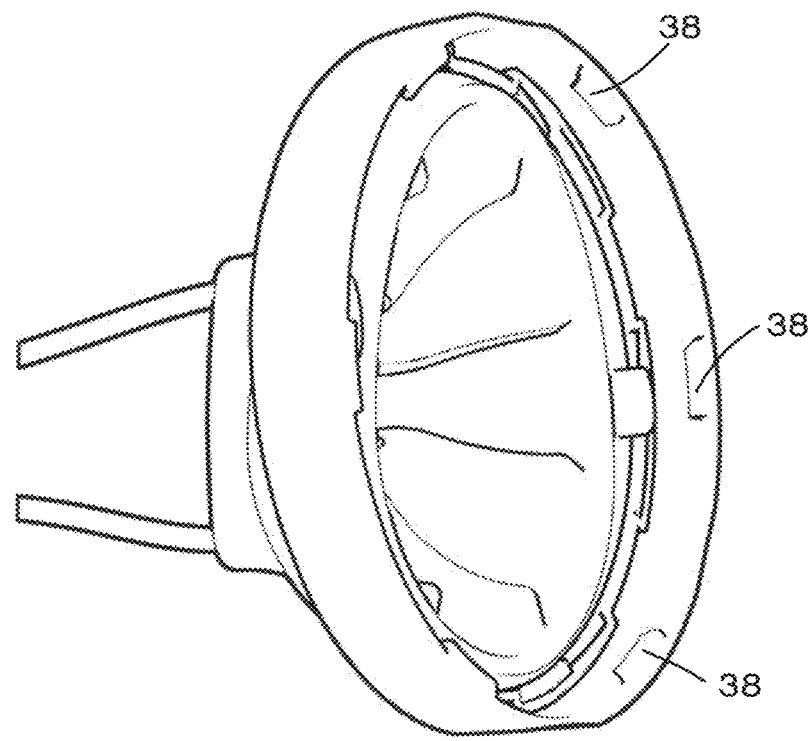
FIG. 13 depicts a detailed view of the mixing device of FIG. 1.
Figure 14:
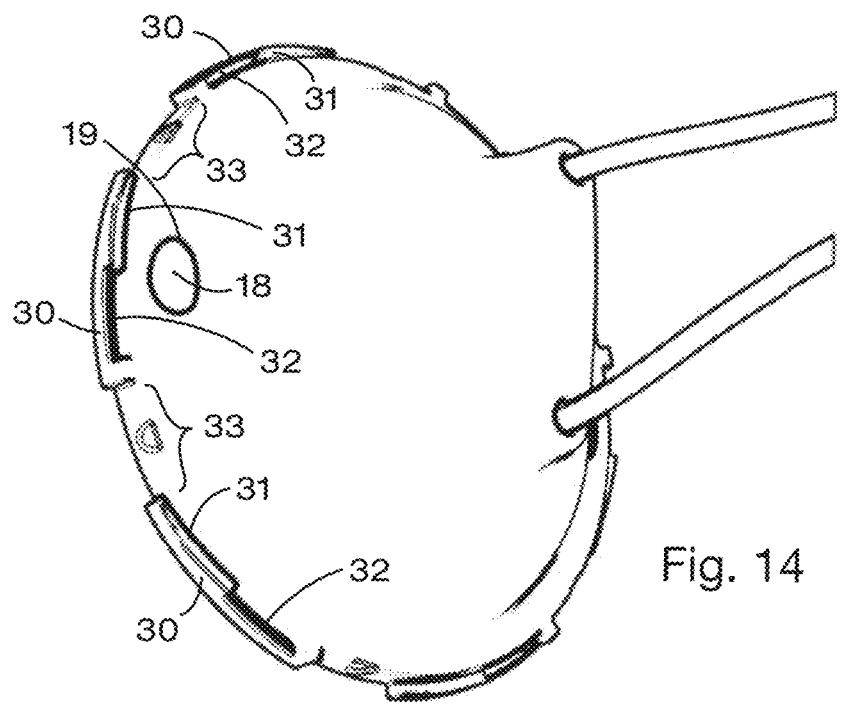
FIG. 14 depicts a detailed view of the mixing device of FIG. 1.
Figure 15:
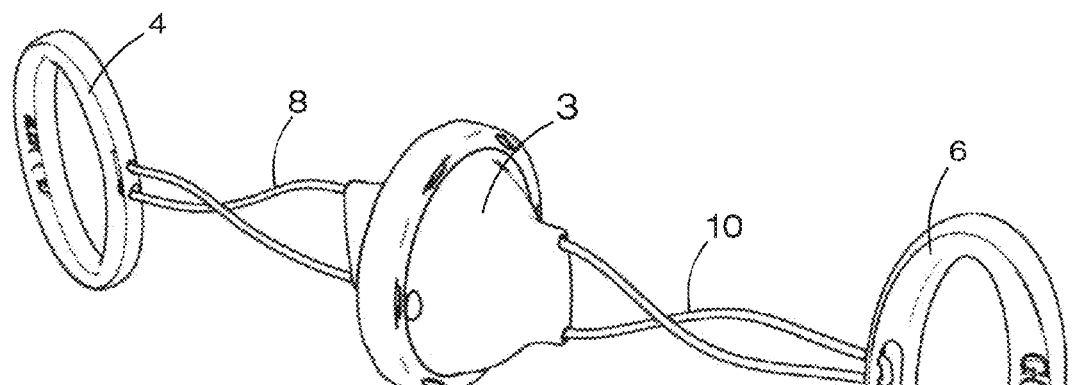
FIG. 15a depicts a top perspective view of the mixing device of FIG. 1.
FIG. 15b depicts a top perspective view of the mixing device of FIG. 1.
FIG. 15c depicts a side view of the mixing device of FIG. 1.
Figure 15:
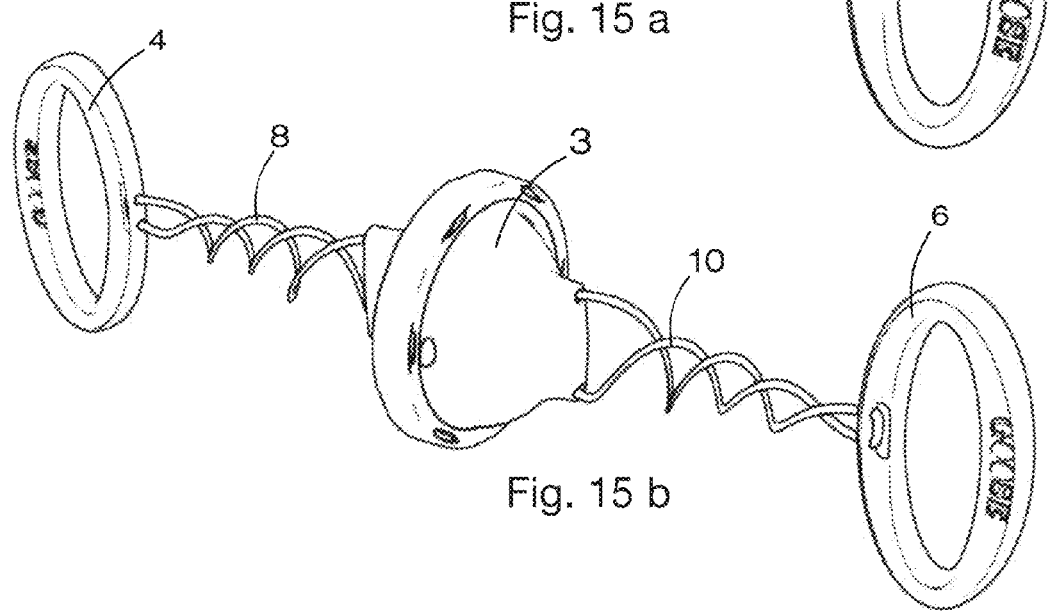
Figure 15:
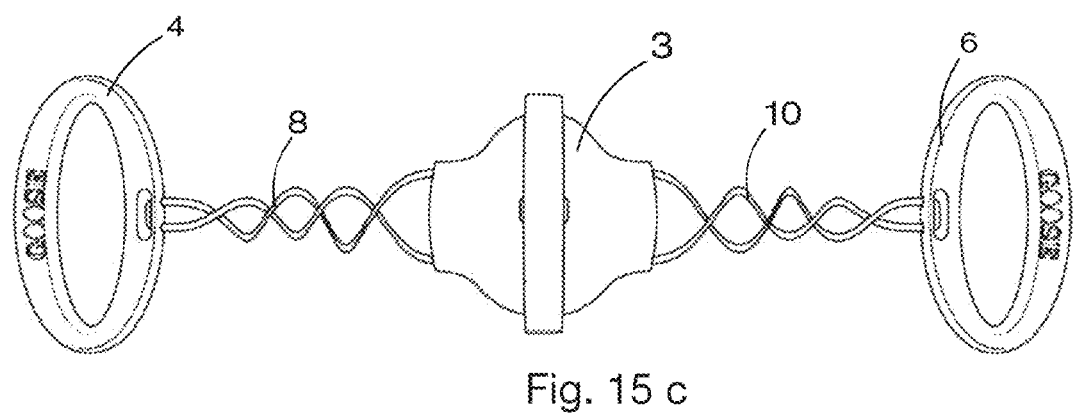
Figure 16:
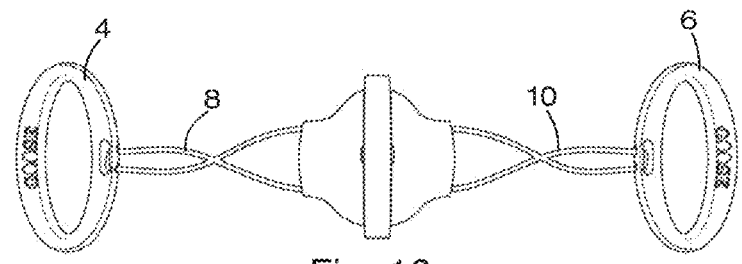
FIG. 16a depicts a side view of the mixing device of FIG. 1.
FIG. 16b depicts a side view of an alternative embodiment of the mixing device of FIG. 1.
FIG. 16c depicts a side view of an alternative embodiment of the mixing device of FIG. 1.
FIG. 16d depicts a side view of an alternative embodiment of the mixing device of FIG. 1.
FIG. 16e depicts a side view of an alternative embodiment of the mixing device of FIG. 1.
Figure 16:
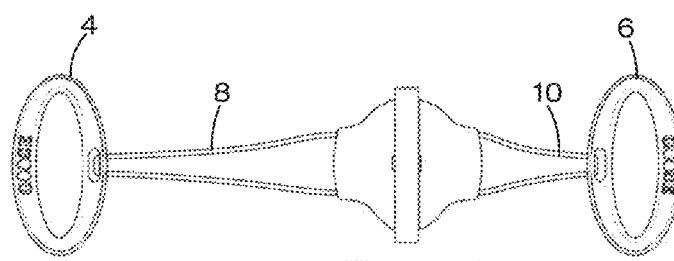
Figure 16:
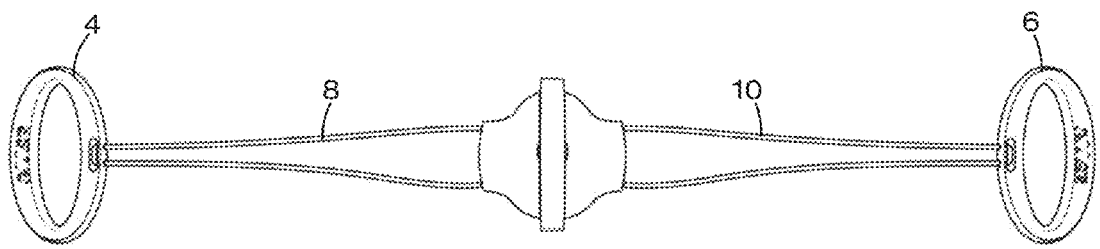
Figure 16:
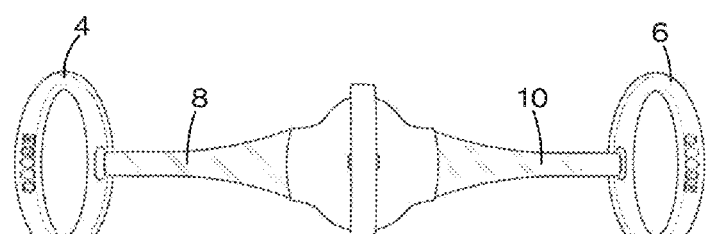
Figure 16:
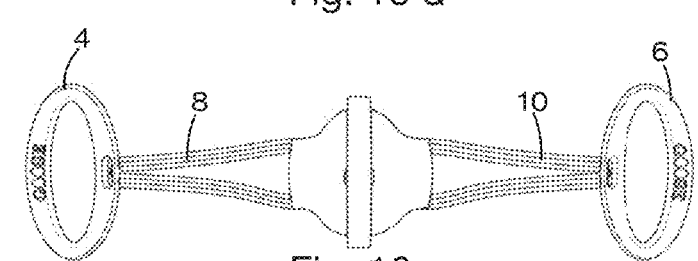
Figure 17:
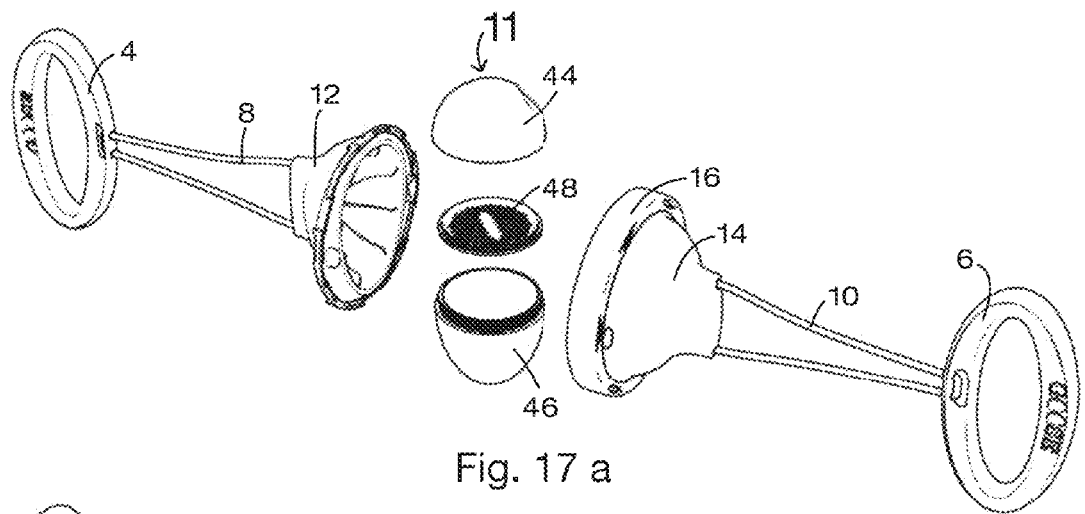
FIG. 17a depicts a top perspective view of the mixing device of FIG. 1.
FIG. 17b depicts a top perspective view of the mixing device of FIG. 1.
FIG. 17c depicts a top perspective view of the mixing device of FIG. 1.
Figure 17:
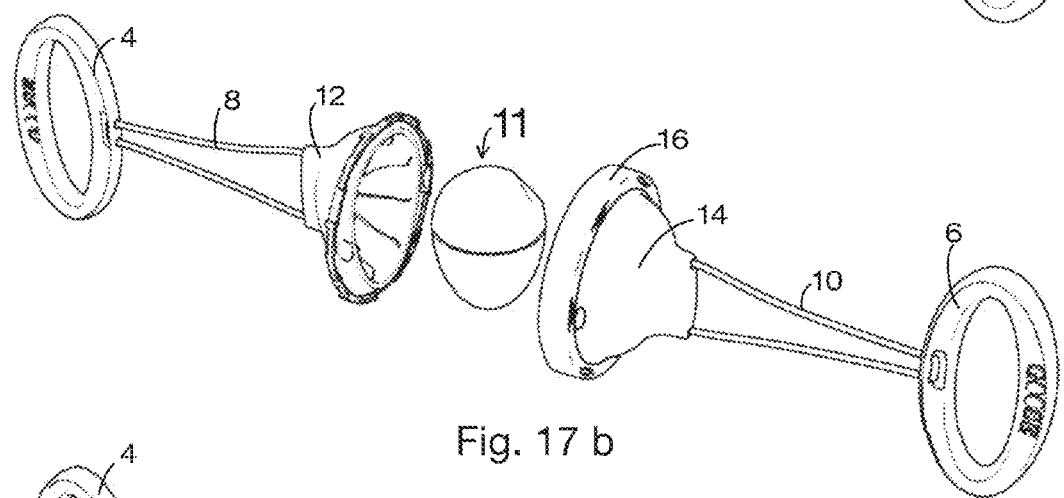
Figure 17:
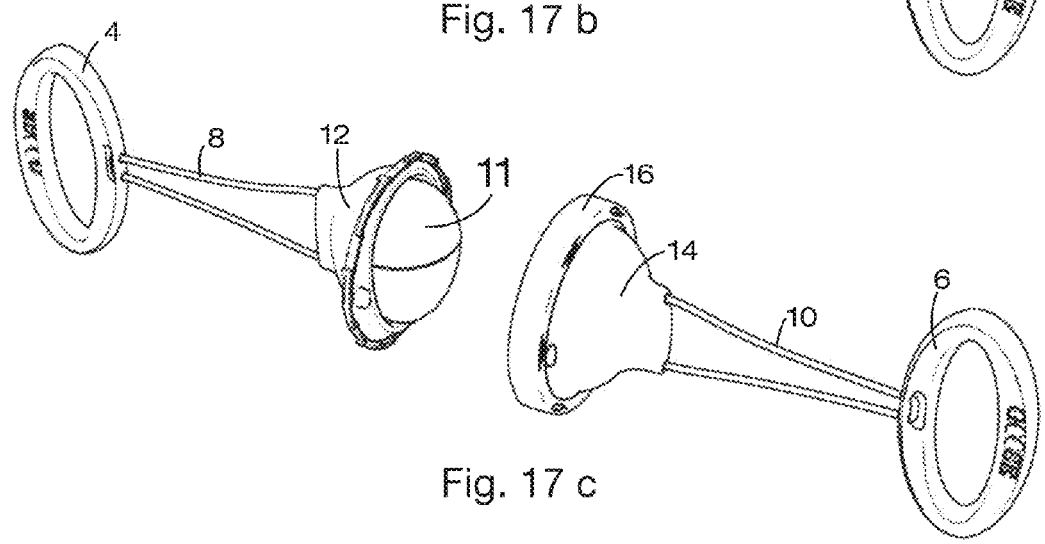
Figure 18:
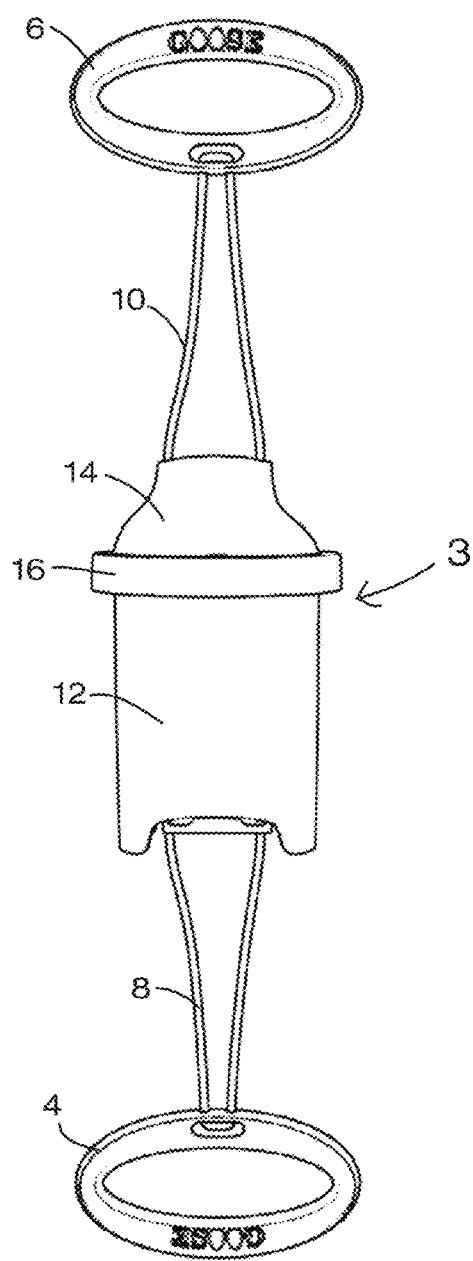
Figure 18:
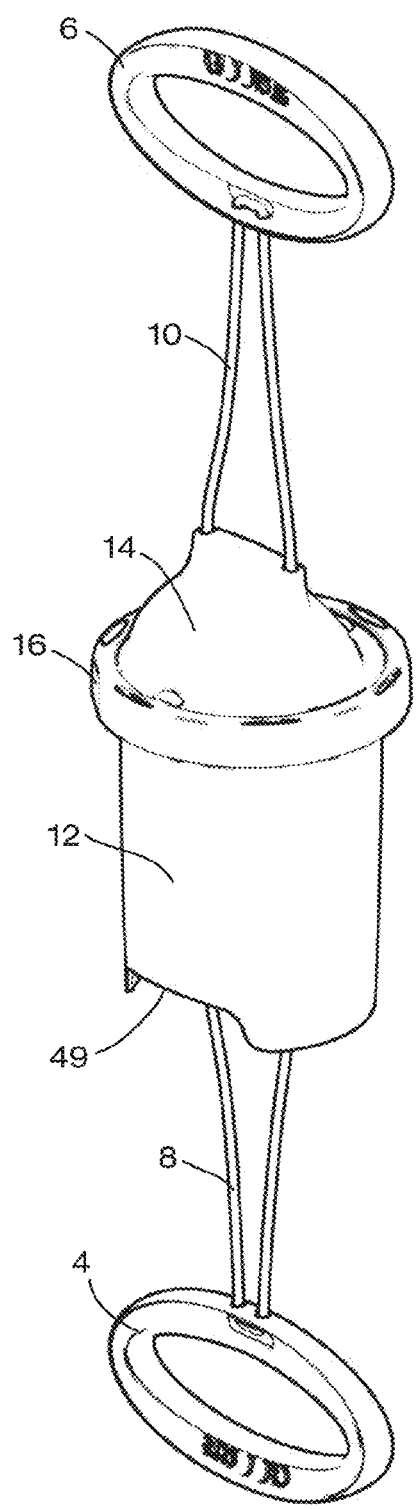
Figure 18:
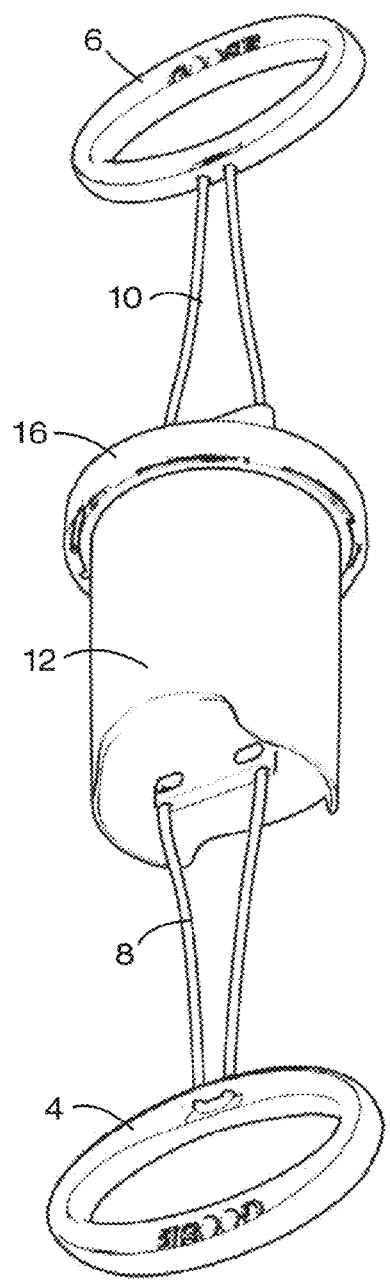
Figure 18:
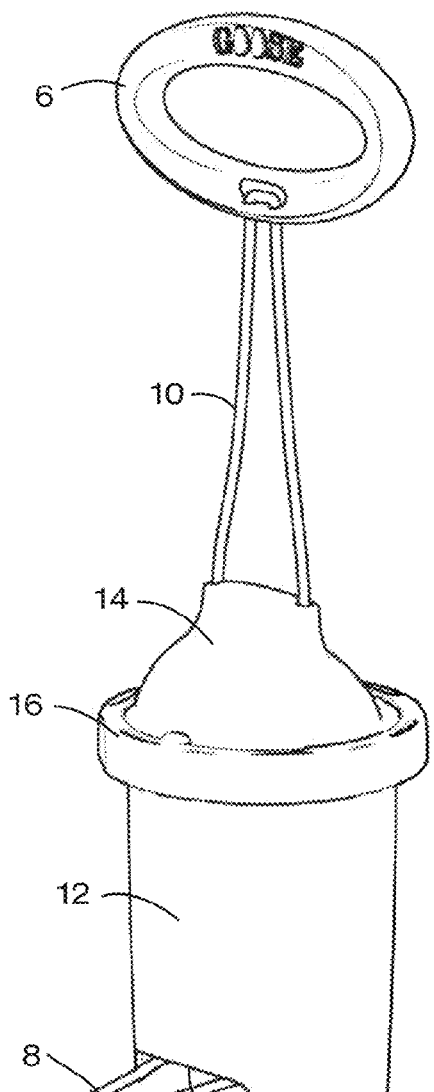
Figure 19:
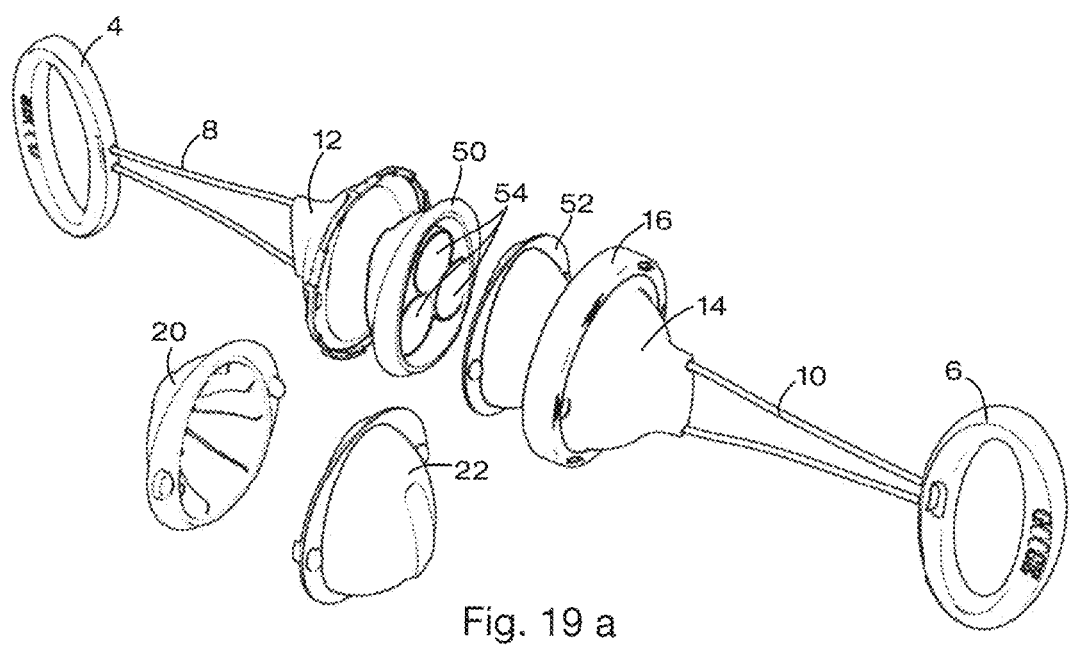
FIG. 19a depicts a top perspective view of the mixing device of FIG. 1.
FIG. 19b depicts a top perspective view of the mixing device of FIG. 1.
Figure 19:
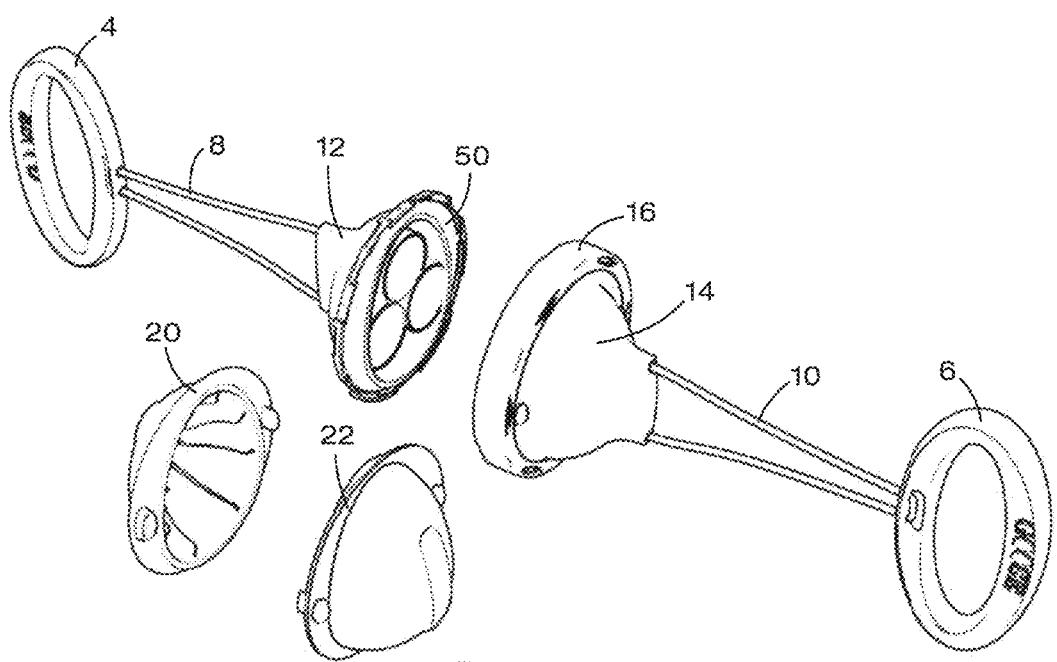

FIGS. 11 and 12 show the attachment of first outer shell 12 to second outer shell 14. In the illustrated embodiment, first outer shell 12 and second outer shell 14 have projections 30 that that can be aligned as first outer shell 12 and second outer shell 14 are placed together. The projections 30 each include a ramp 31 and a detent 32, and the projections 30 are spaced around the outer perimeters 36, 37 of each of first outer shell 12 and second outer shell 14 by cavities 33.

First inner shell 20 and second inner shell 22 project slightly outward from first outer shell 12 and second outer shell 14, respectively, so that the outer edge 34 of first inner shell 20 contacts the outer edge 35 of second inner shell 22 before the outer shells 12, 14 can contact each other. The reason for this configuration is so that the elasticity of the inner shells 20, 22 can provide an outward force that pushes first outer shell 12 and second outer shell 14 away from each other while the outer shells are locked together. This configuration also helps seal the mixing item inside of housing 3 while mixing device 2 is in use.

To attach first outer shell 12 and first inner shell 20 (collectively, "the first side 5") to second outer shell 14 and second inner shell 22 (collectively, "the second side 7"), the first side 5 and second side 7 are placed together so that the mating features 27, 28 of the inner shells are mated and/or so that the projections 30 of the outer shells match up. Attachment mechanism 16 can then be placed over the adjacent outer edges 36, 37 of first outer shell 12 and second outer shell 14. In the illustrated embodiment, attachment mechanism 16 includes protrusions 38 (FIG. 13) that slide in an attachment direction through the cavities 33 formed between the projections 30 of the outer shells 12, 14. Once the protrusions 38 pass through the cavities 33, attachment mechanism 16 can be twisted with respect to housing 3 so that the protrusions 38 slide up the respective ramps 31 and then lock into the detents 32 to prevent attachment mechanism 16 from shifting in a direction opposite to the attachment direction. Attachment mechanism 16 includes a ledge 39 (FIGS. 9 and 10) that prevents attachment mechanism 16 from shifting in the attachment direction during use as the ledge 39 contacts the protrusions 30 from the other of first outer shell 12 and second outer shell 14 that does not contact the protrusions 38.

While attachment mechanism is locked, the outer edge 34 of first inner shell 20 is pressed against the outer edge 35 of second inner shell 22. This provides an outward force against attachment mechanism 16 that prevents attachment mechanism 16 from dislodging during use. The compression of outer edge 34 of first inner shell 20 against the outer edge 35 of second inner shell 22 also provides a seal for the contents of housing 3. First outer housing 12 is detached from second outer housing 14 by pushing first outer housing 12 towards second outer housing 14 and twisting attachment 16 in the opposite direction of attachment.

In the illustrated embodiment, attachment mechanism 16 is a separate ring that attaches first outer shell 12 to second outer shell 14, but attachment mechanism 16 can be any mechanism capable of attaching first outer shell 12 to second outer shell 14 about a mixing item. For example, first outer shell 12 and second outer shell 14 can be joined together by clamps, latches, bands, clips, compression fits, snaps, buttons, bindings, bayonets, threads, and other attachment devices understood by those of ordinary skill in the art.

FIGS. 15*a* to 15*c* show how mixing device 2 can be used once a mixing item, for example an egg or container, has been placed between first inner shell 20 and second inner shell 22 and once first outer shell 12 has been attached to second outer shell 14. In use, a user grasps first handle 4 and second handle 6 with different hands, and the user holds the handles steady while rotating housing 3 about a stationary or wobbling axis that extends between the handles, which causes first cord 8 and second cord 10 to twist as shown in FIGS. 15*b* and 15*c*. As first cord 8 and second cord 10 are twisted and tension builds from the twisting, first handle 4 and second handle 6 are drawn inward towards housing 3. The user can then pull outwardly on first handle 4 and/or second handle 6 to release the tension caused by the twisting of the cords, thereby causing housing 3 to spin in the opposite direction that housing 3 was rotated to create the tension. In an embodiment, the handles 4, 6 can be held out to the side of mixing device 2, and housing 3 can be rotated about an approximately horizontal axis extending from first handle 4 to second handle 6.

It may be desirable to rotate housing 3 several times to properly mix the mixing item or contents thereof. A user can therefore repeat the process described above by continuously causing the housing to rotate in opposite directions. After first cord 8 and second cord 10 are initially wound and then unwound by a user pulling the handles 4, 6 away from the housing 3, the momentum from the unwinding rotation of housing 3 can cause the cords 8, 10 to wind in the other direction, again placing the mixing device 2 in a tensioned configuration in which the handles are drawn inward towards housing 3. The user can then once again pull outwardly on first handle 4 and/or second handle 6 to release the tension caused by the cords, thereby again causing housing 3 to rotate back in the original direction that housing 3 was rotated to create the initial tension. This process can be repeated by continuously pulling the handles outward, allowing the rotational momentum of the housing to pull the handles inward, and then pulling the handles outward again. This process can be repeated until the mixing item or contents thereof have been sufficiently mixed together or apart.

Figure 33:
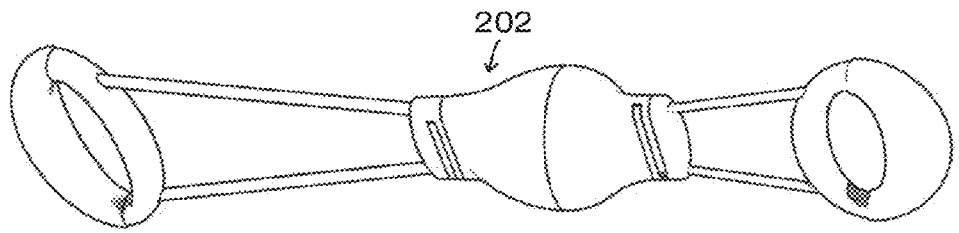
Figure 33:
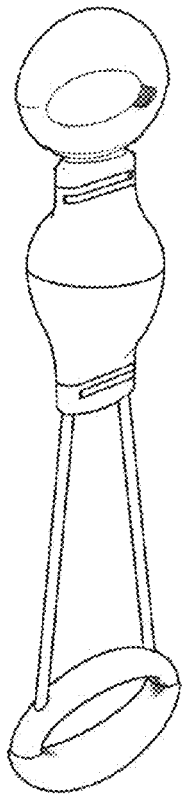
Figure 33:
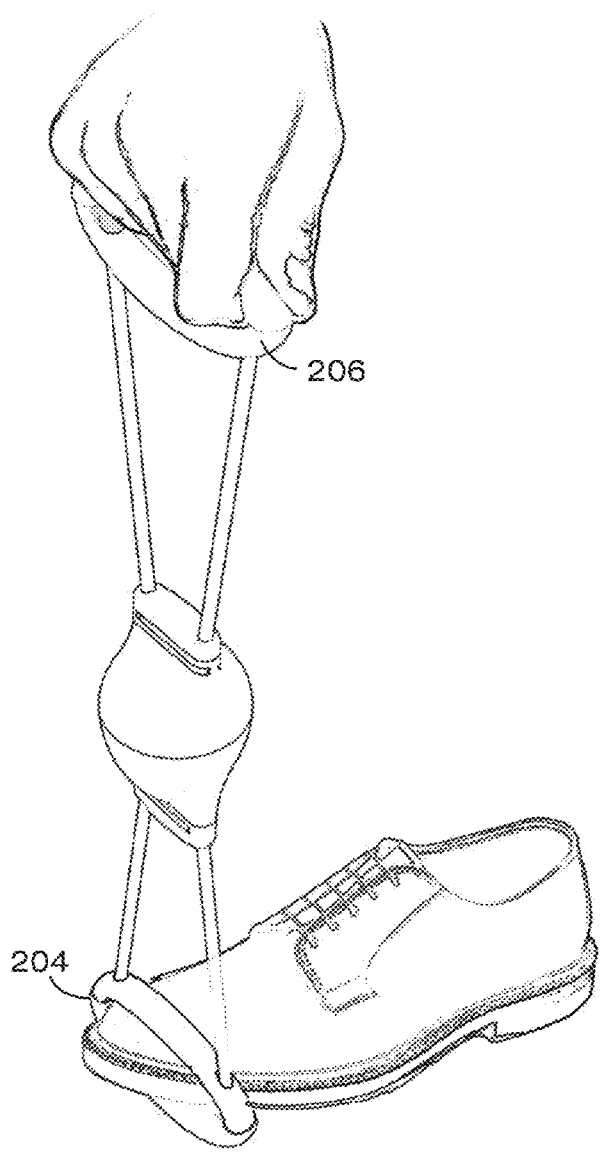

Those of ordinary skill in the art will understand that mixing device 12 does not need to be held horizontally between a user's hands to function properly. An advantage of the present disclose is that mixing device 2 can be used in a variety of environments and spaces. In an embodiment, either one of first handle 4 or second handle 6 can be attached to an inanimate object. In another embodiment, a user can step on one of first handle 4 or second handle 6 with his or her foot and operate mixing device 2 in a vertical configuration so that the rotation is about a vertical axis (FIG. 33*c*). In the vertical configuration, the user pulls upward on second handle 6 to cause housing 3 to rotate about an approximately vertical axis.

First cord 8 and second cord 10 can be any rigid or elastic cord, band, rope, string or other string or band-like cord known to those of skill in the art. In a preferred embodiment, first cord 8 and second cord 10 are nylon cords or other solid graded, abrasion resistant materials. First cord 8 and second cord 10 can be looped through cavities 45 in first handle 4 (FIGS. 6 and 7) and second handle 6, and can be attached to first outer shell 12 and second outer shell 14 in the same manner. In such an embodiment, the user can adjust the first and second cords through the cavity 45 by moving the handle with respect to the cord. Alternatively, first cord 8 and second cord 10 can be fixedly attached to their respective handles and/or outer shells, for example, with zip ties or knots. In the embodiment shown in FIGS. 6 and 7, first cord 8 is looped through first handle 4 to form a first portion 40 and a second portion 42 that connect to each of first handle 4 and first outer shell 12, and first portion 40 is fixed to first outer shell 12 at aperture 41 and second portion 42 is fixed to first outer shell 12 at aperture 43. Having first and second portions 40, 42 is advantageous when causing rotation of the device as shown in FIGS. 15*a* to 15*c* because the tension that builds from the twisting of both portions 40, 42 is greater than the tension that would build from a single portion. Alternatively, second portion 42 can be eliminated, and first cord 8 can attach to first handle 4 at a single point and to first outer shell 12 at a single point.

FIGS. 16*a* to 16*e* show different cord lengths and types. FIG. 16*a* shows the cords 8, 10 of FIG. 1 for comparison purposes. FIG. 16*b* shows an embodiment in which first cord 8 is longer than second cord 10. Such an embodiment could, for example, allow a user to rotate mixing device 2 using only one hand. FIG. 16*c* shows an embodiment in which first cord 8 and second cord 10 have been lengthened. FIG. 16*d* shows an embodiment in which first cord 8 and second cord 8 are formed as straps between the housing 3 and the respective handles 4, 6. FIG. 16*e* shows an embodiment in which first cord 8 and second cord 10 are each double cords. FIGS. 16*a* to 16*e* show that there are many different configurations of cords that can be used with mixing device 2 to sufficiently mix the contents of a mixing item, and those of ordinary skill in the art may recognize additional cord configurations not specifically illustrated herein.

Figure 35:
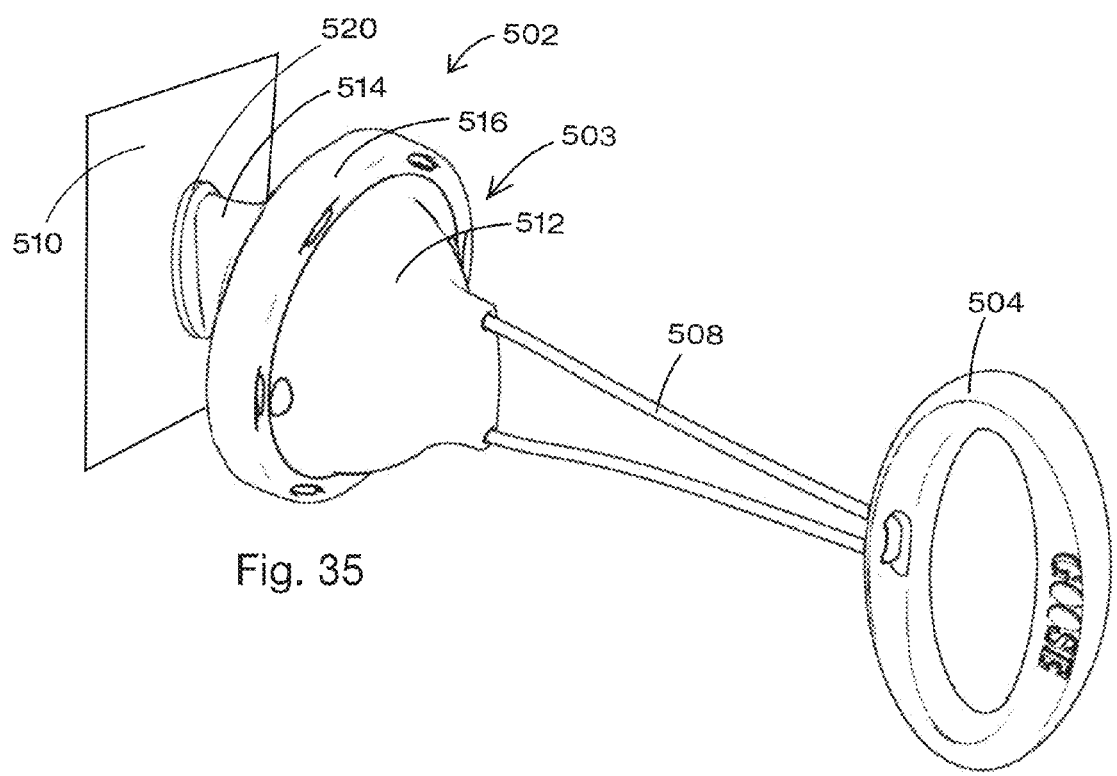
FIG. 35 depicts a perspective view of an alternative embodiment of the mixing device of FIG. 1.

First handle 4 and second handle 6 can be modified or can be eliminated altogether. For example, one of the handles can be shaped to grab an inanimate object so that only the other handle needs to be pulled to rotate housing 3. Alternatively, one of first cord and/or second cord may be permanently fixed to another object so that only the other handle needs to be pulled to rotate housing 3. Further alternatively, one or both handles can be eliminated altogether, and a user can rotate housing 3 by pulling first cord 6 and/or second cord 8 in a direction away from housing 3. Even further alternatively still, housing 3 can be attached to a stationary device on one side by a rotatable hinge, and a user can rotate housing 3 by pulling on a single cord on the opposite side of the housing from the hinge (FIG. 35).

FIGS. 17*a* to 17*c* show an alternative mixing item that can be used with mixing device 2 as opposed to an egg. In the embodiment shown, the mixing item includes a mixing container 11 in the shape of an egg so that it can be inserted into housing 3 interchangeably with standard sized eggs. Mixing item 11 includes a top shell 44, a bottom shell 46, and a sifter 48. In an embodiment, sifter 48 is a diffusing membrane or a perforated membrane. In use, a first mixing item (e.g., a first fluid, semi-fluid or solid) can be placed in the top shell 44, and a second mixing item (e.g., a second fluid, semi-fluid or solid) can be placed in the bottom shell 46. The rotation of housing 3 can the be used to infuse the first mixing item with the second mixing item, or vice versa.

An advantage of the egg-shaped cavity of mold 26 of first inner shell 20 and second inner shell 22 is that both an actual egg and an egg-shaped container can be used with first inner shell 20 and second inner shell 22 of mixing device 2. Those of ordinary skill will also understand that there are many different shaped cavities besides an egg-shape that can be used with mixing device 2.

FIGS. 18*a* to 18*g* show another embodiment of mixing device 2 in which first outer shell 12 is not the same shape as second outer shell 14. In the embodiment shown, first outer shell 12 and second outer shell 14 are shaped to form housing 3 as an 8 to 12 ounce martini shaker. In an embodiment, alcohol (i.e., a first mixing item) and ice (i.e., a second mixing item) can be inserted between first outer shell 12 and second outer shell 14, and can be mixed as described above. An indentation 49 also allows first outer shell 12 to be placed on its side until the contents of first outer shell 12 are ready to be poured. In the embodiment shown, the first cord 8 and second cord 10 are longer than the cords described above so as to accommodate the larger housing 3.

FIGS. 19a and 19b show the interchangeability of inner shells 20, 22. As discussed above, an advantage of forming the inner shells 20, 22 as separate pieces from the outer shells 12, 14 is that various different inner shells can be removeably attached to the outer shells to accommodate different mixing items. In FIGS. 19a and 19b, first and second inner shells 20, 22 can be removed from the respective outer shells 12, 14 and replaced with first inner shell 50 and second inner shell 52. First inner shell 50 and second inner shell 52 attach to first outer shell 12 and second outer shell 14 in the same manner as first inner shell 20 and second inner shell 22. In the embodiment shown, first inner shell 50 and second inner shell 52 include molds 54 that are configured to hold three eggs. Alternatively, different inner shells can be molded to hold different sized eggs or containers, paints and dies, an array of vials or liquids, a freely rotating gyroscope, or the like.

Figure 20:
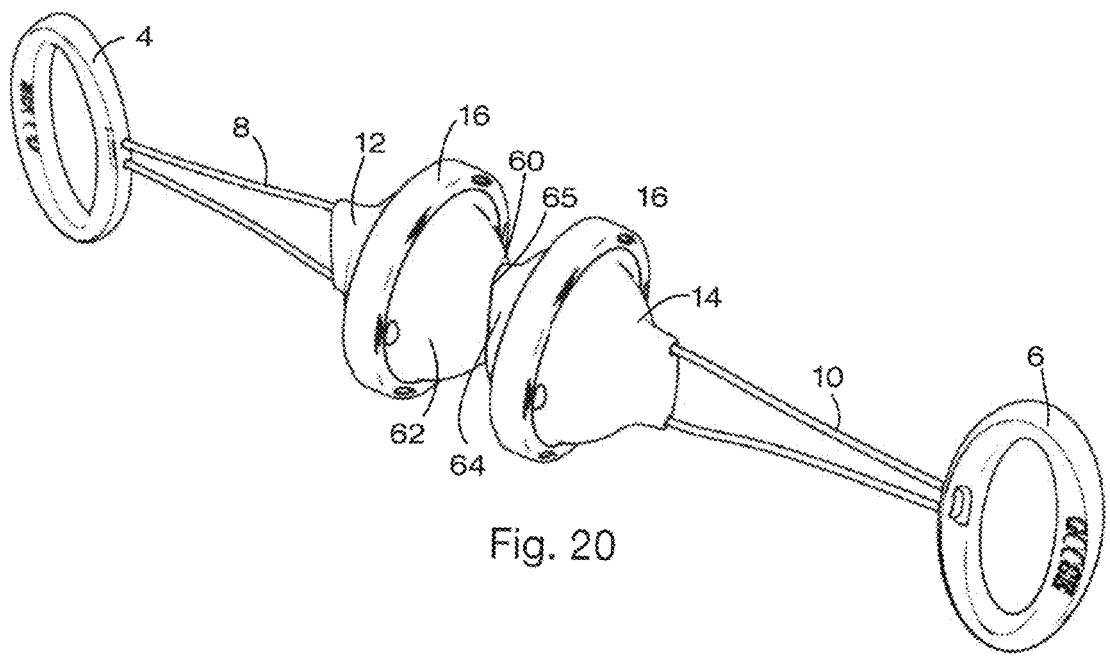
FIG. 20 depicts an alternative embodiment of the mixing device of FIG. 1.

FIG. 20 shows an embodiment in which a third outer shell 60 can be placed between first outer shell 12 and second outer shell 14. In the illustrated embodiment, third outer shell 60 includes two separate shells 62, 64 attached at a center portion 65. In the embodiment shown, shell 62 and shell 64 are formed as one piece attached at center portion 65. Shell 62, which is attached to first outer shell 12 by an attachment mechanism 16, includes an inner shell that corresponds to or mirrors first inner shell 20 of first outer shell 12. Shell 64, which is attached to second outer shell 14 by an attachment mechanism 16, includes an inner shell that corresponds to or minors second inner shell 22 of second outer shell 14. By using a third outer shell 60, a user can rotate two eggs, two mixing containers 11, one egg and one mixing container 11, or any other combination of mixing items corresponding to any number of inner shell molds that can be interchangeably placed inside each of the outer shells. Those of ordinary skill in the art will understand that the same type of configuration can be used to rotate more than two eggs or mixing containers at the same time.

Figure 21:
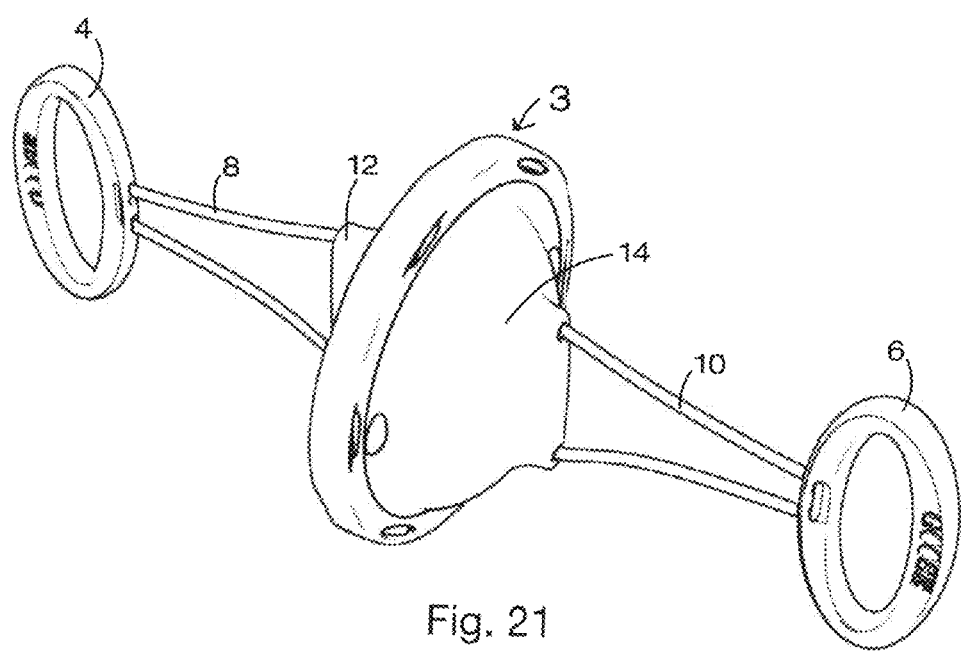
FIG. 21 depicts an alternative embodiment of the mixing device of FIG. 1.

FIG. 21 shows an embodiment in which the size of housing 3 is greatly increased in comparison to previous embodiments. In the embodiment shown, the larger housing 3 can be used to mix multiple chicken eggs at the same time, to mix ostrich eggs, or to centrifuge chemical vials. Operation of housing 3 of FIG. 21 is the same as described above.

Figure 22:
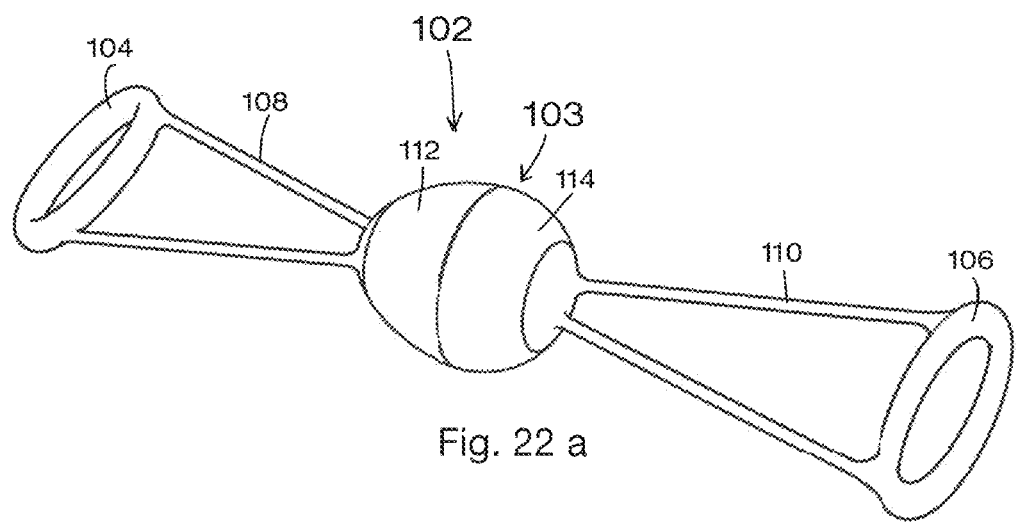
Figure 22:
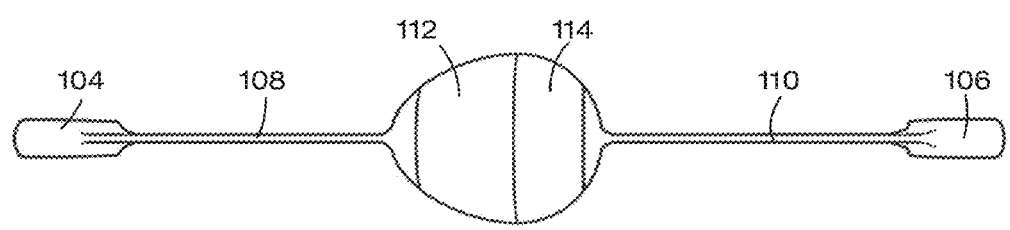
Figure 22:
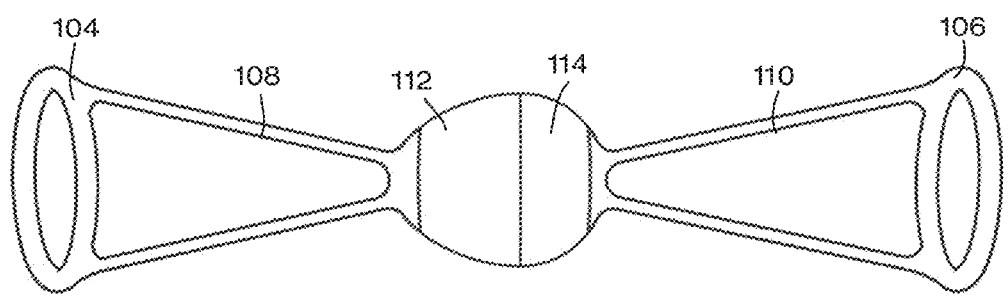

FIGS. 22a to 22c show an alternative embodiment of a mixing device 102. Like mixing device 2, mixing device 102 includes a housing 103, a first handle 104, a second handle 106, a first cord 108 and a second cord 110. Just as with mixing device 2, one or more mixing items can be placed inside housing 103, and housing 103 can be rotated about an axis that extends from first handle 104 to second handle 106 so that the one or more mixing items placed inside housing 103 are mixed by the rotation of housing 103.

Figure 23:
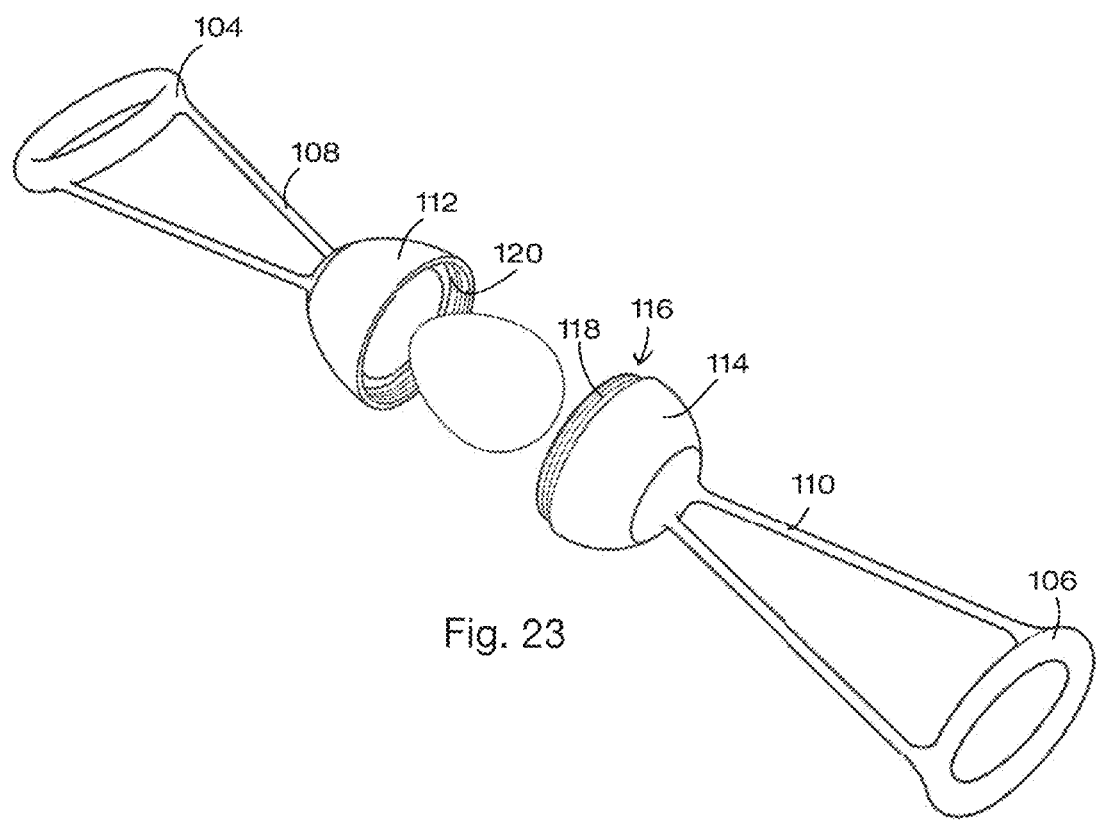

Like mixing device 2, mixing device 102 includes a first outer shell 112, a second outer shell 114 and an attachment mechanism 116. As shown in FIG. 23, attachment mechanism 116 includes a threaded portion 118 protruding from second outer shell 114 and a corresponding threaded portion 120 on an inner surface of first outer shell 112. The threaded portions 116, 118 can be screwed together to removeably attach first outer shell 112 to second outer shell 114 around a mixing item such as an egg or other container. Like mixing device 2, mixing device 102 can also include first and second inner shells with molds for the mixing item. All other aspects of mixing device 2 described above can also be included in mixing device 102, and all aspects of mixing device 102 can be included in mixing device 2.

FIGS. 24a to 24e show that mixing device 102 is used in the same manner as mixing device 2. The arrows indicate alternating pull forces and alternating rotational forces enabled by the manual winding and manipulation of the cords. Alternatively, the cords can be pre-wound or automatically wound.

Figure 24:
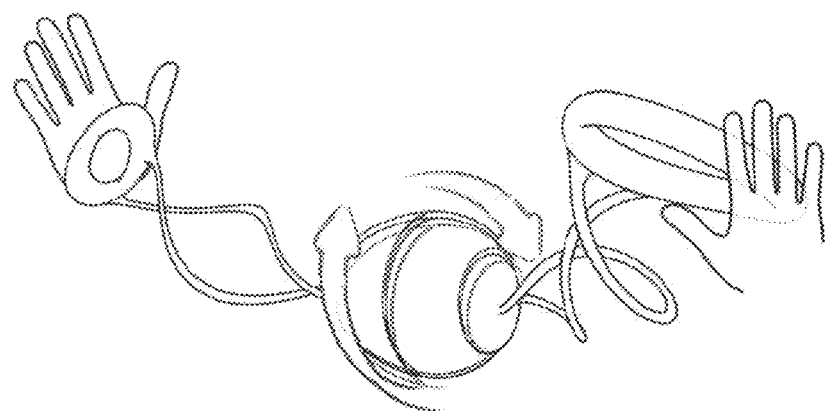
Figure 24:
Figure 24:
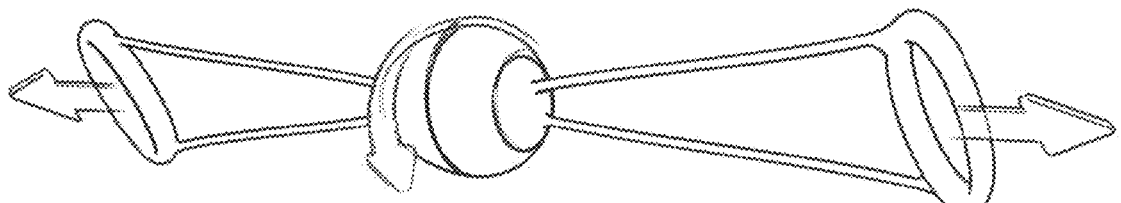
Figure 24:
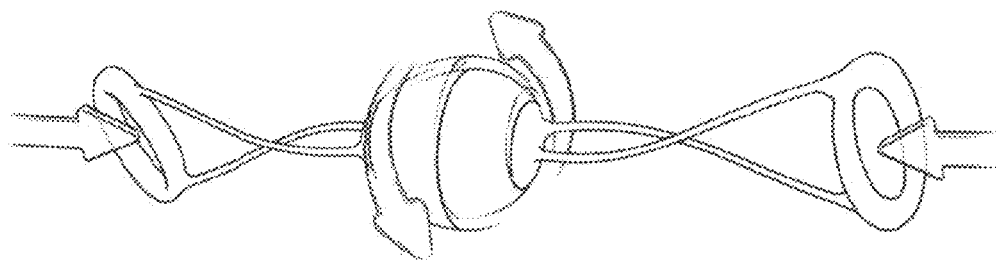
Figure 24:
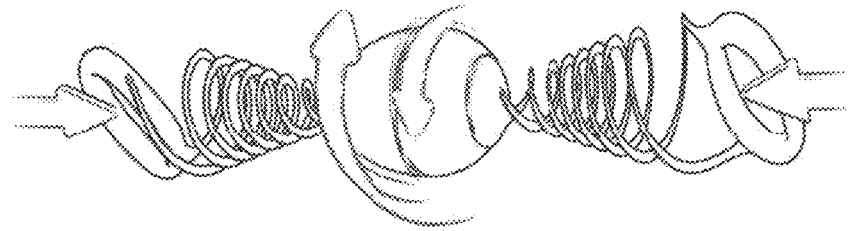

FIG. 24a shows mixing device 102 after a mixing item has been placed between first outer shell 112 and second outer shell 114. Beginning with FIG. 24a, a user holds first handle 104 with one hand and second handle 106 with the other hand, and the user rotates housing 103 by swinging housing 103 between the handles while keeping the handles steady, which causes first cord 108 and second cord 110 to twist about a stationary or wobbling axis that extends between the handles. As shown in FIG. 24b, as first cord 108 and second cord 110 are twisted and tension builds, first handle 104 and second handle 106 are drawn inward towards housing 103. In FIG. 24c, the user pulls outwardly on first handle 104 and/or second handle 106 to release the tension, thereby causing housing 103 to spin in the opposite direction that housing 103 was rotated to create the tension in the cords. FIG. 24e shows that even after first cord 108 and second cord 110 are unwound, the momentum from the rotation of housing 103 can cause the cords to wind in the other direction, again placing the device in a tensioned configuration in which the handles are drawn inward towards housing 103. The user can then once again pull outwardly on first handle 104 and/or second handle 106 to release the tension in the cords, thereby causing housing 103 to rotate back in the original direction that housing 103 was rotated to first create the tension. As discussed above, this process can be repeated by continuously pulling the handles outward and then letting the rotation pull the handles back inward, until the mixing item or contents thereof have been sufficiently mixed.

Figure 25:
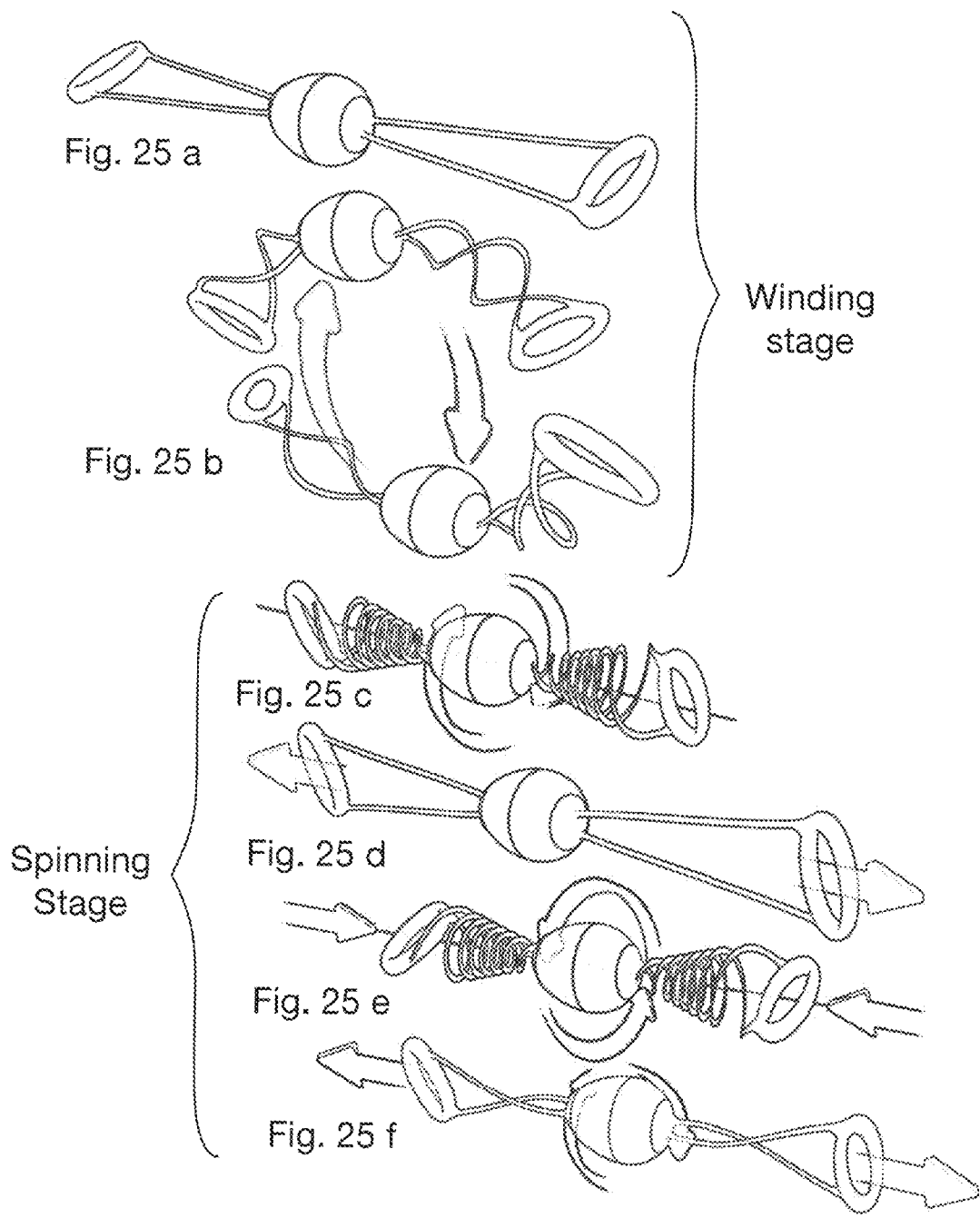

FIGS. 25a and 25b show the initial winding stage, and FIGS. 25c to 25f show the repeated mixing stage. Alternative to FIGS. 25a and 25b, the cords can be pre-wound or automatically wound. As shown in FIGS. 25a and 25b, mixing device 102 can be wound, for example, by rotating housing 103 and allowing housing 103 to twist the first and second cords 108, 110 and pull first and second handles 104, 106 inward. Once the tension has been initially loaded, FIGS. 25c to 25f show that a user can continuously rotate housing 103 in opposite directions by pulling the first and second handles 104, 106 outward and then allowing the rotation of housing 103 to pull the handles back inward.

Figure 26:
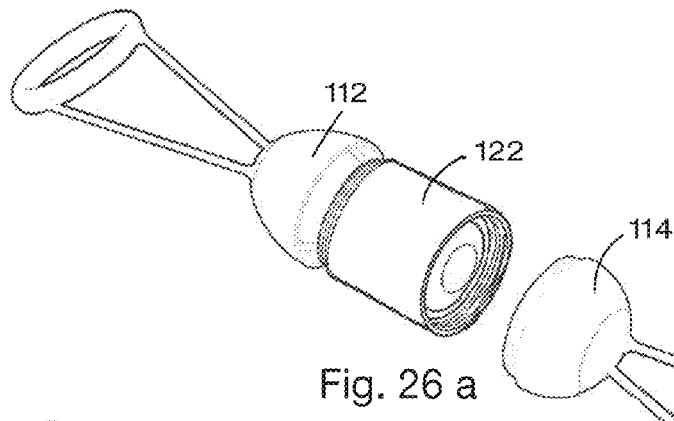
Figure 26:
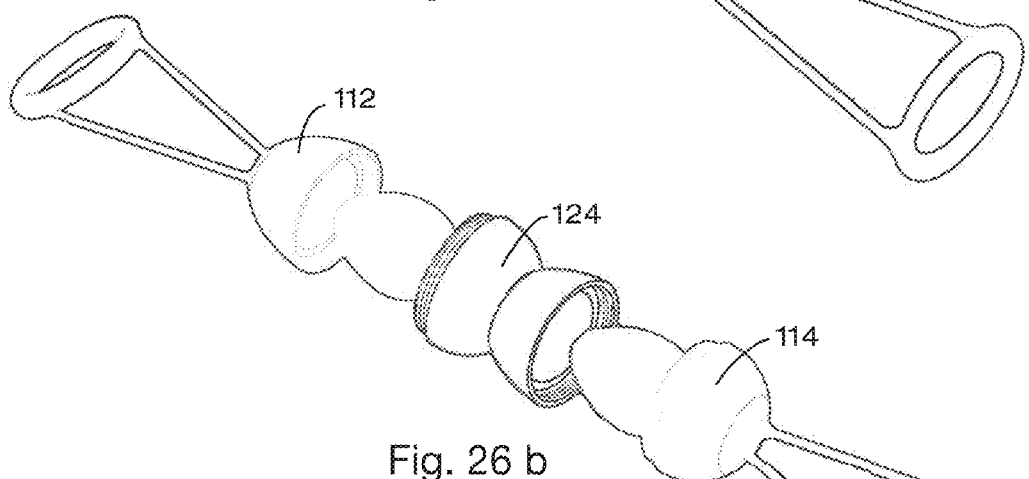
Figure 26:
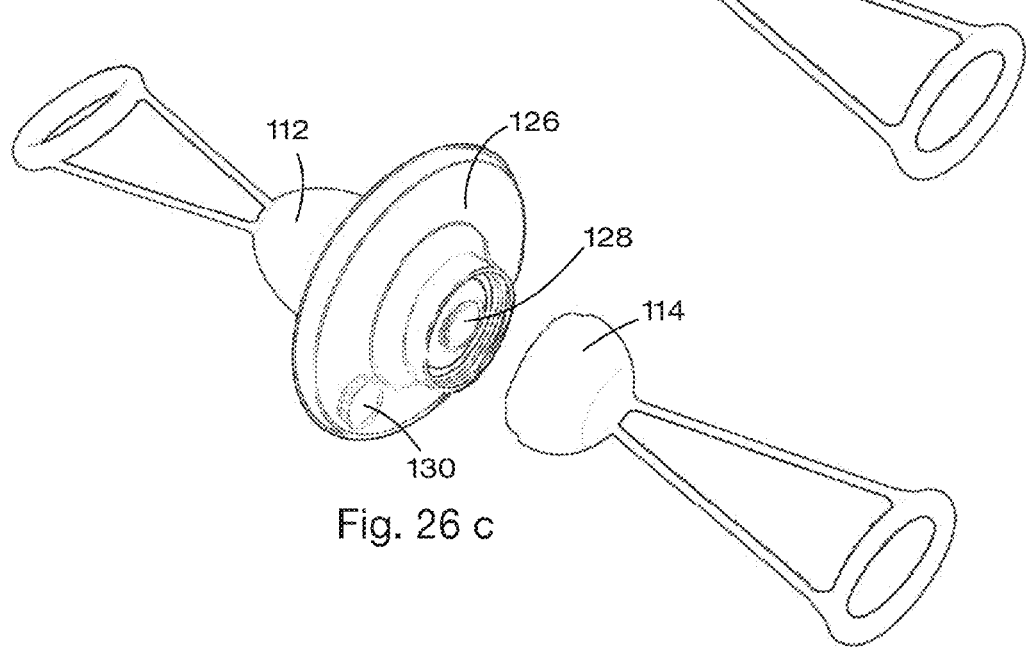

FIGS. 26a to 26c show additional components of housing 103 that can be attached using attachment mechanism 16 including threaded portions 118 and 120. FIG. 26a shows a container 122 that can be inserted between first outer shell 112 and second outer shell 114 and provides more mixing space than described above. FIG. 26b shows a third outer shell 124, similar to third outer shell 60 above, which allows two eggs or mixing containers 11 to be used at the same time. FIG. 26c shows that a centrifuge 126 can be inserted between first outer shell 112 and second outer shell 114. Centrifuge 126 includes a first container 128 and a second container 130, and a mixing item can be inserted into first container 128 and mixed apart across a diffusing membrane between first container 128 and second container 130 so that a portion of the mixing item is centrifuged into second container 130. In an embodiment, centrifuge 126 can be used, for example, to separate fluids from semi-fluids and solids.

Figure 27:
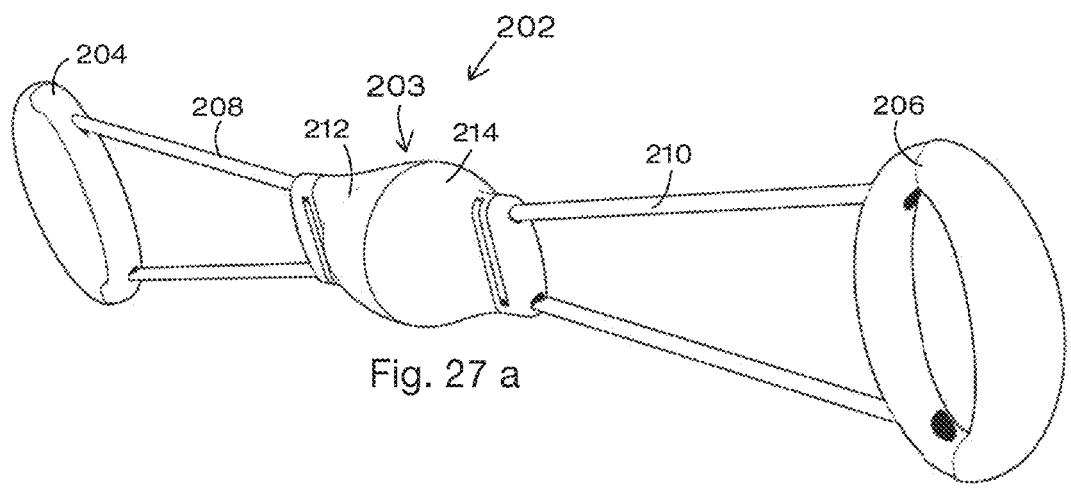
Figure 27:
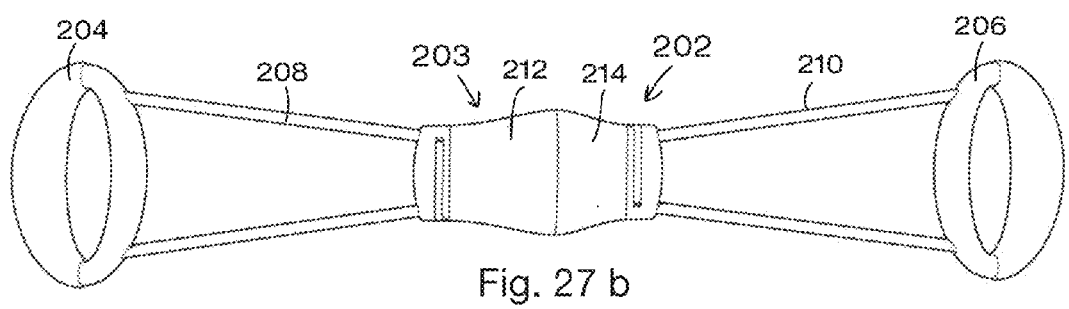
Figure 27:
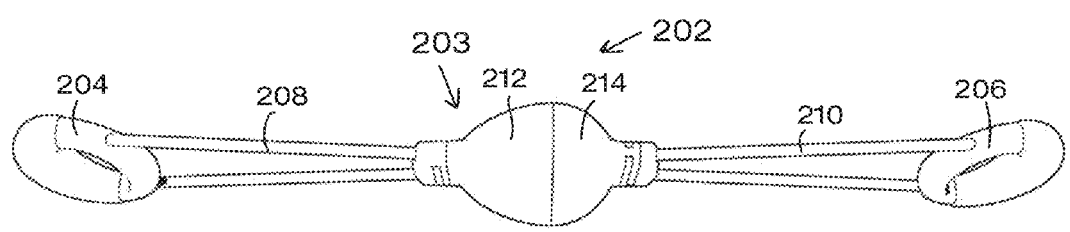

FIGS. 27a to 27c show an alternative embodiment of a mixing device 202. Like mixing device 2, mixing device 202 includes a housing 203, a first handle 204, a second handle 206, a first cord 208 and a second cord 210, and housing 203 includes a first outer shell 212 and a second outer shell 214. Just as with mixing device 2, one or more mixing items can be placed inside housing 203, and housing 203 can be rotated about an axis that extends from first handle 204 to second handle 206 so that the one or more mixing items placed inside housing 203 are mixed by the rotation of housing 203. All aspects of mixing devices 2 and 102 described above can also be included in mixing device 202, and all aspects of mixing device 202 can be included in mixing devices 2 and 102.

Figure 28:
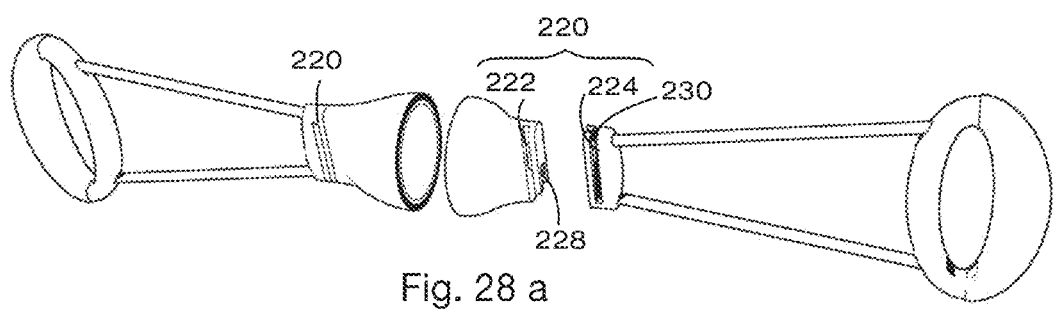
Figure 28:
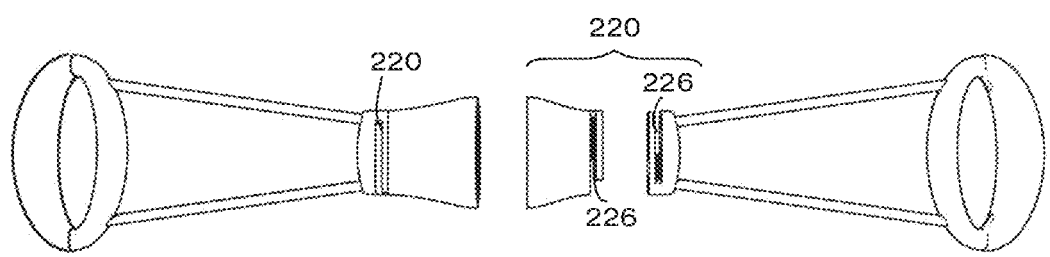
Figure 28:
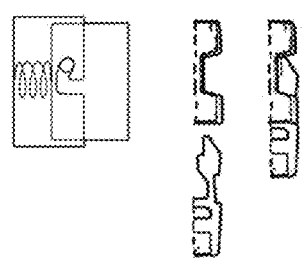

Mixing device 202 differs from the previous embodiments in that it includes a sliding cord attachment mechanism 220, which is shown more clearly in FIGS. 28a and 28b. Cord attachment mechanism 220 includes a housing portion 222 and a cord portion 224. Housing portion 222 and cord portion 224 each include corresponding slots 226 that slide into each other so that a flexible snap 228 on housing portion 222 can attach to a corresponding section on cord portion 224 and/or so that a flexible snap 230 on cord portion 224 can attach to a corresponding section on housing portion 222. Alternatively, FIG. 28c shows that cord attachment mechanism can include a bayonet or threaded attachment, a snap and quick-release buckle, or any other cord attachment device understood by those of ordinary skill in the art.

Figure 29:
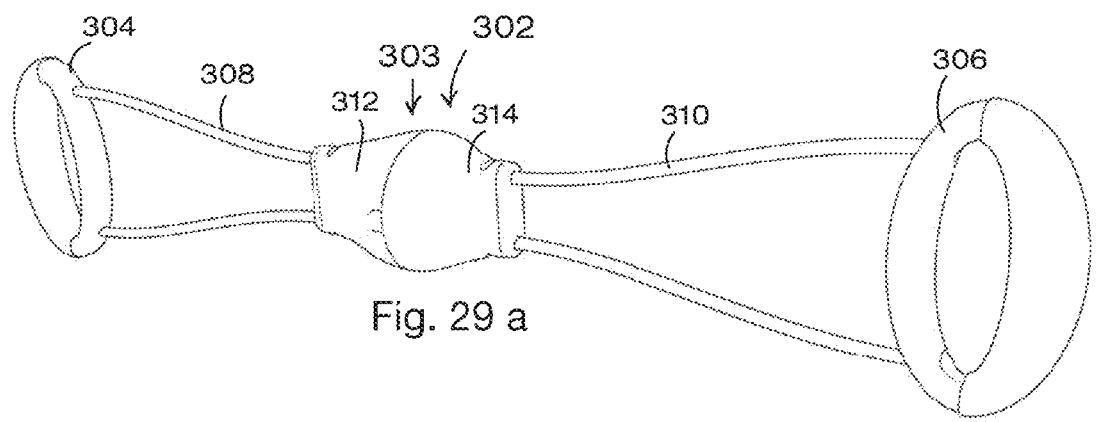
Figure 29:
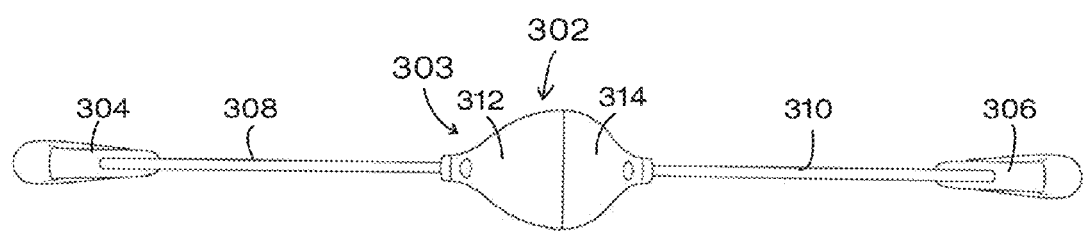
Figure 29:
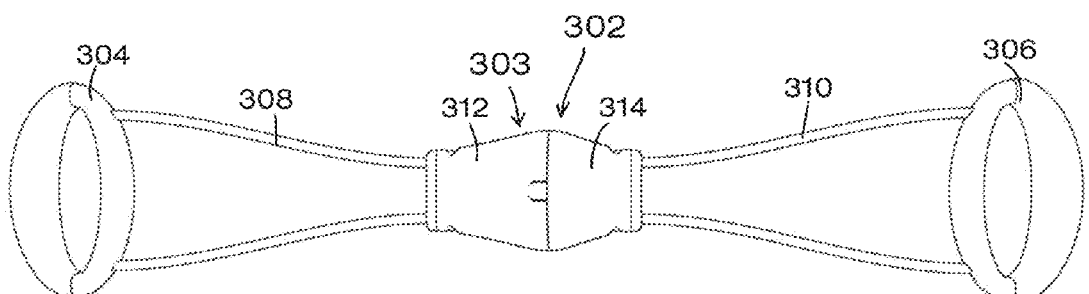

FIGS. 29a to 29c show an alternative embodiment of a mixing device 302. Like mixing device 2, mixing device 302 includes a housing 303, a first handle 304, a second handle 306, a first cord 308 and a second cord 310, and housing 303 includes a first outer shell 312 and a second outer shell 314. Just as with mixing device 2, one or more mixing items can be placed inside housing 303, and housing 303 can be rotated about an axis that extends from first handle 304 to second handle 306 so that the one or more mixing items placed inside housing 303 are mixed by the rotation of housing 303. All aspects of mixing devices 2, 102 and 202 described above can also be included in mixing device 302, and all aspects of mixing device 302 can be included in mixing devices 2, 102 and 202.

Figure 30:
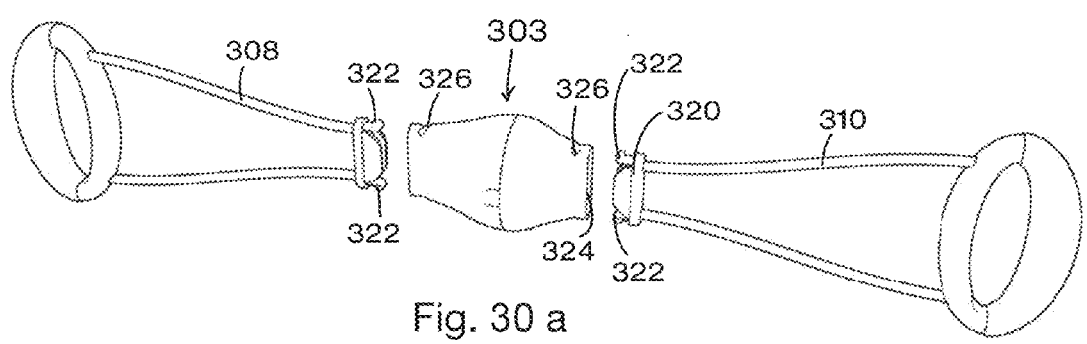
Figure 30:
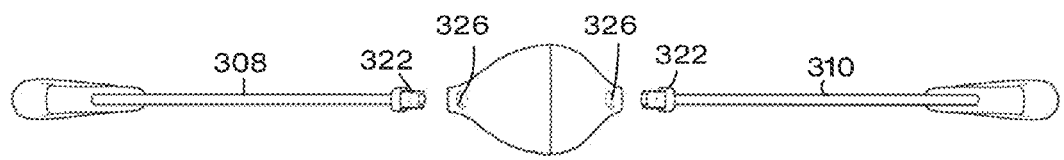
Figure 30:
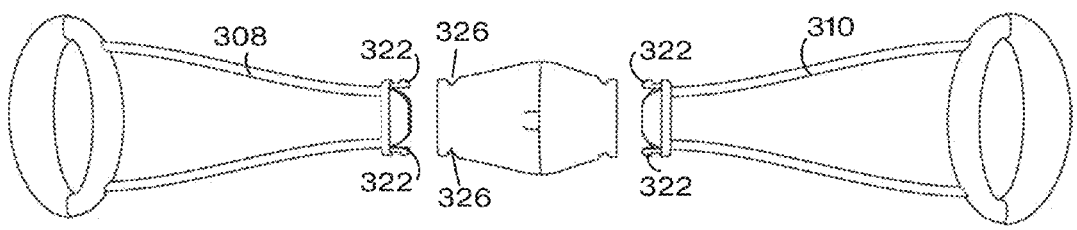
Figure 31:
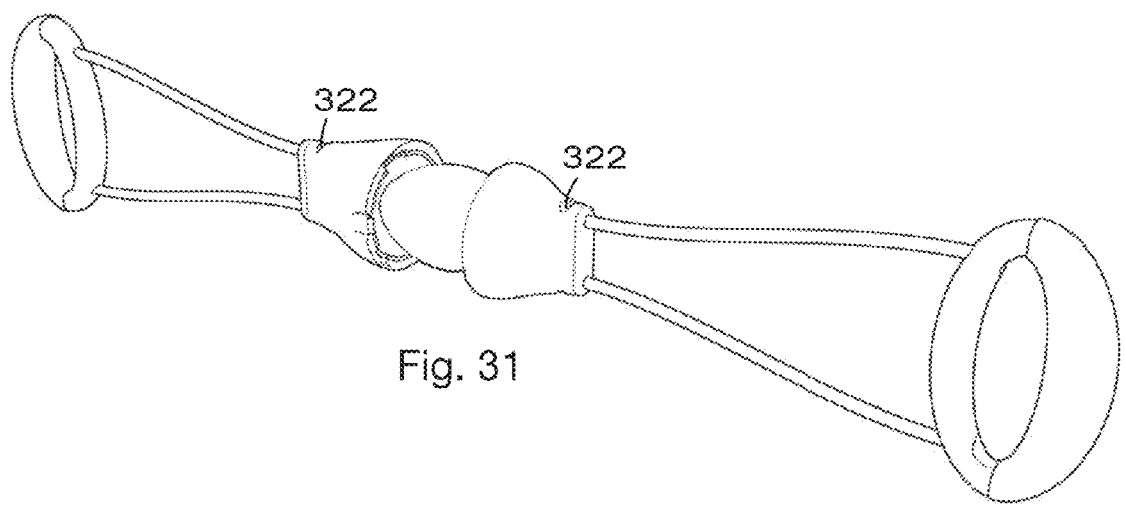

Mixing device 302 includes a cord attachment mechanism 320, which is shown more clearly in FIGS. 30a to 30c. Cord attachment mechanism 320 includes quick-release buckles 322 which can be inserted into a first aperture 324 of housing 303. Once inserted into first aperture 324, quick-release buckles 322 protrude through a second aperture 326 in housing 303 (FIG. 31). A user simply must press inward on quick-release buckles 322 to release cord attachment mechanism 320 from housing 303.

Figure 32:
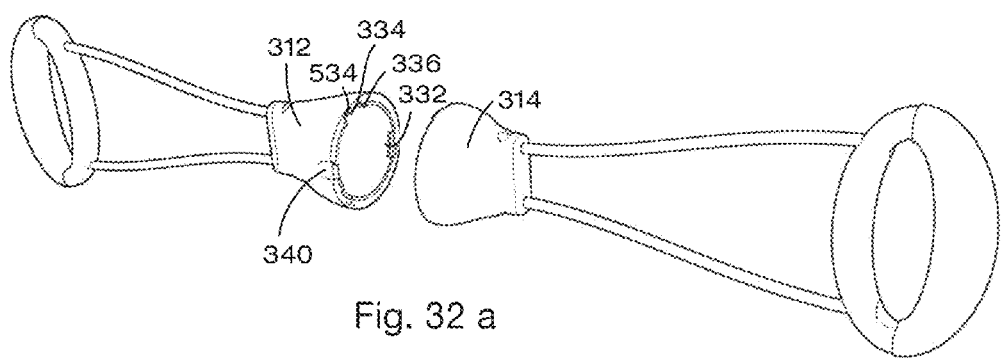
Figure 32:
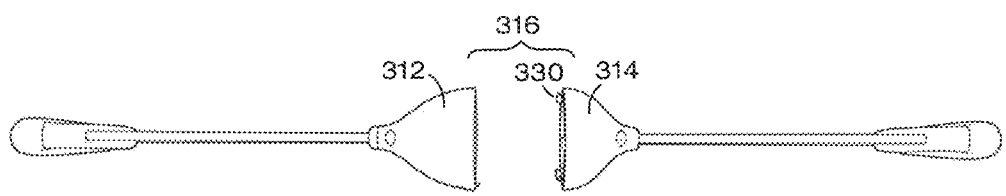
Figure 32:
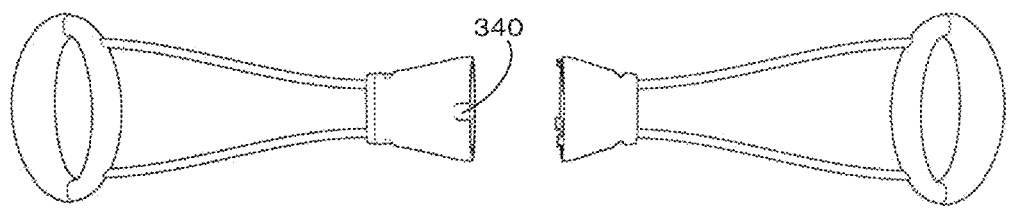

FIGS. 32a to 32b show how first outer shell 312 and second outer shell 314 of housing 303 attach to each other with an attachment mechanism 316 including protrusions 330, slots 332 and a latch release button 340. In an embodiment, one of first outer shell 312 and second outer shell 314 (here second outer shell 314) includes protrusions 330 that slide into slots 332 in the other of first outer shell 312 and second outer shell 314 (here first outer shell 312). Each slot has an entry portion 334 and a retainment portion 336. A user attaches first outer shell 312 to second outer shell 314 by lining up each protrusion 330 with an entry portion 334, and then rotating at least one of the outer shells so that each protrusion 330 slides into a corresponding retainment portion 336. FIGS. 32a and 32c show that mixing device 302 also includes a latch release button 340 that can lock first outer shell 312 and second outer shell 314 together. In the embodiment shown, latch release button 340 includes a protrusion that grabs an edge of second outer shell 314 to lock first outer shell 312 and second outer shell 314 together. To release first outer shell 312 from second outer shell 314, a user must simply press inward on latch release button 340.

FIGS. 33a to 33e show different cord lengths and types for mixing device 202. FIG. 33a shows an embodiment in which first cord 208 is longer than second cord 210. FIG. 33b shows an embodiment in which first cord 208 has been eliminated. FIG. 33c shows that mixing device 202 does not need to be held horizontally between a user's hands to function properly. For example, FIG. 33c shows a user stepping on first handle 204 with their foot and operating mixing device 202 in a vertical configuration so that the rotation is about a vertical axis. In the vertical configuration shown in FIG. 33c, the user pulls upward on second handle 206 to cause housing 203 to rotate about an approximately vertical axis.

Figure 34:
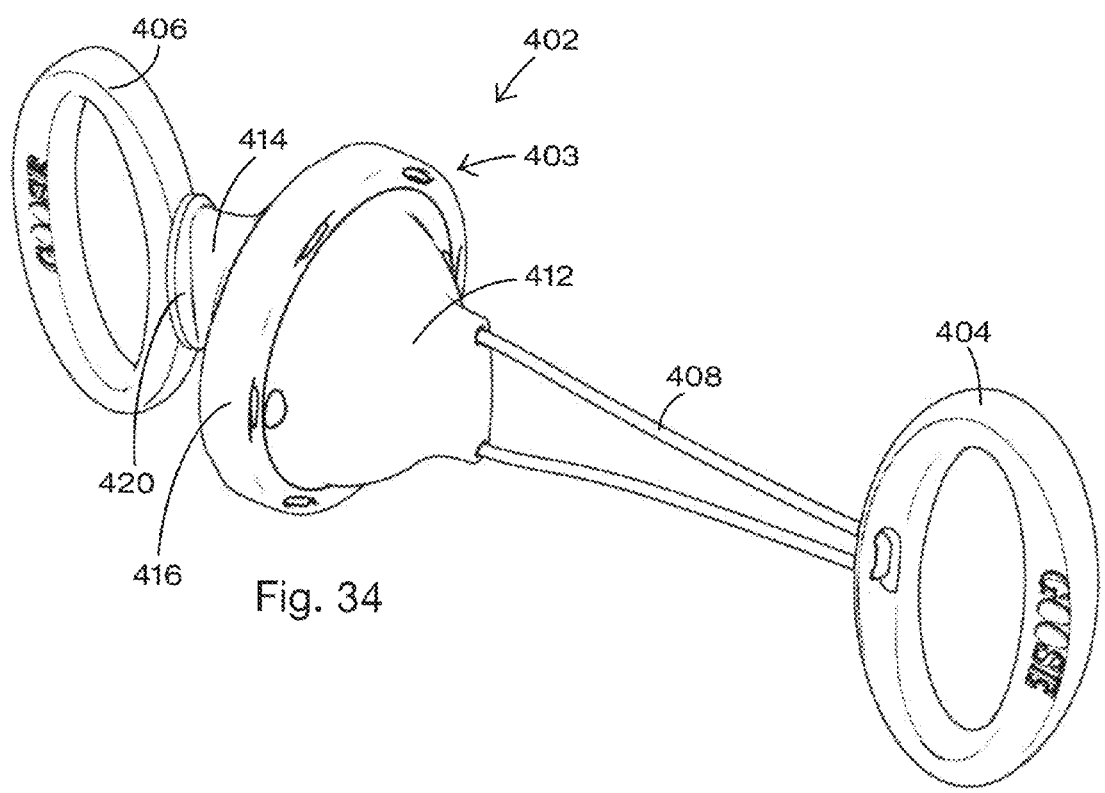
FIG. 34 depicts a perspective view of an alternative embodiment of the mixing device of FIG. 1.

FIG. 34 shows an alternative embodiment of a mixing device 402. Like mixing device 2, mixing device 402 includes a housing 403, a first handle 404, a second handle 406 and a first cord 408, and housing 403 includes a first outer shell 412 and a second outer shell 414 that can be attached with an attachment mechanism 416. Just as with mixing device 2, one or more mixing items can be placed inside housing 403, and housing 403 can be rotated about an axis that extends from first handle 404 to second handle 406 so that the one or more mixing items placed inside housing 403 are mixed by the rotation of housing 403.

The difference between mixing device 402 and mixing device 2 is that second cord 10 has been replaced with a rotational joint 420. In an embodiment, rotational joint 420 can be any joint that allows housing 103 to rotate with respect to second handle 406, and can utilize, for example, ball bearings, a ball and socket joint, or the like. All aspects of mixing devices 2, 102, 202 and 302 described above can also be included in mixing device 402, and all aspects of mixing device 402 can be included in mixing devices 2, 102, 202 and 302.

Mixing device 402 functions in the same way as mixing device 2, except that the user holds second handle 406 steady and rotates housing 403 by pulling on first handle 404. A user can manually wind, pre-wind or automatically wind housing 403 in a first direction about and axis extending between first handle 404 and second handle 406. The user can then rotate housing 403 in the opposite direction by pulling outward on first handle 406.

FIG. 35 shows an alternative embodiment of a mixing device 502. Like mixing device 2, mixing device 502 includes a housing 503, a first handle 504 and a first cord 508, and housing 503 includes a first outer shell 512 and a second outer shell 514 that can be attached with an attachment mechanism 516. Just as with mixing device 2, one or more mixing items can be placed inside housing 503, and housing 503 can be rotated about an axis that extends towards first handle 504 so that the one or more mixing items placed inside housing 503 are mixed by the rotation of housing 503.

Like mixing device 402, mixing device 502 includes a rotational joint 520. Mixing device 502 attaches rotational joint 520 to an inanimate object 510. Mixing device 502 functions in the same way as mixing device 402, except that the user does not need to hold a second handle. A user can manually wind, pre-wind or automatically wind housing 503 in a first direction about an axis extending towards first handle 504. The user can then rotate housing 503 in the opposite direction by pulling outward on first handle 506. All aspects of mixing devices 2, 102, 202, 302 and 402 described above can also be included in mixing device 502, and all aspects of mixing device 502 can be included in mixing devices 2, 102, 202, 302 and 402.

Figure 36:
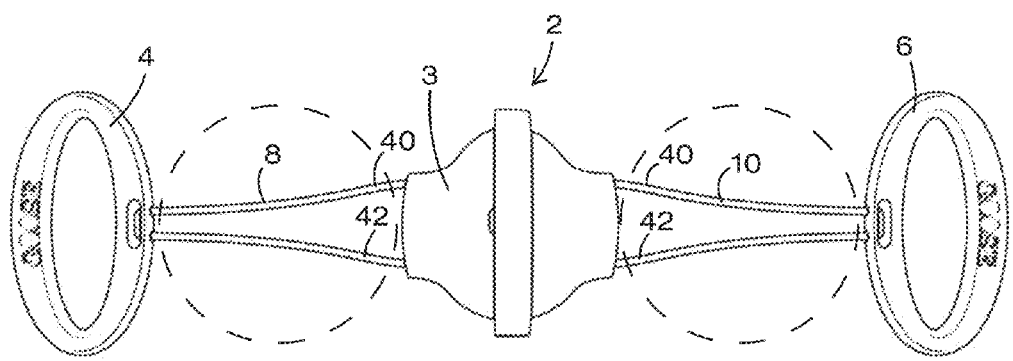
FIG. 36 depicts a side view of the mixing device of FIG. 1.
Figure 37:
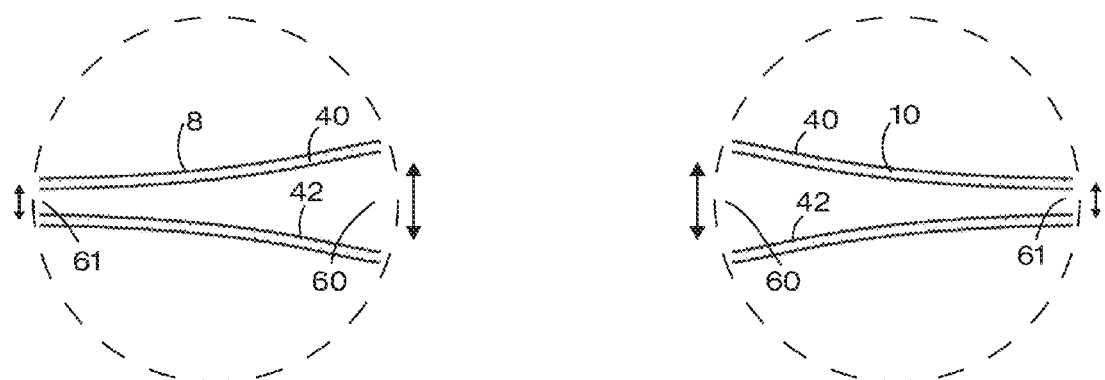
FIG. 37 depicts a detailed view taken from FIG. 36.

FIGS. 36 and 37 show a preferred embodiment of mixing device 2 including the first cord 8 and the second cord 10 as described above. Each of the first and second cords 8, 10 includes a first portion 40 and a second portion 42 as described above. FIG. 37 shows that the distance 60 between the edges of the first portion 40 and the second portion 42 at the points of attachment to housing 3 is greater than the distance 61 between the edges of the first portion 40 and the second portion 42 at the points of attachment to the respective first and second handles 4, 6. This configuration has been found to be advantageous in creating tension in the cords 8, 10 and therefore causing rotation of the cords.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Additional Aspects of the Present Disclosure

Aspects of the subject matter described herein may be useful alone or in combination with any one or more of the other aspect described herein. Without limiting the foregoing description, in a first aspect of the present disclosure, a mixing device includes a housing including a cavity configured to hold an item and at least one cord attached to the housing. The at least one cord is configured to cause the housing to rotate when the at least one cord is pulled in a direction away from the housing.

In accordance with a second aspect of the present disclosure, which may be used in combination with any other aspect or combination of aspects listed herein, the housing is configured to be rotated in a first direction to place tension on the cord, and the at least one cord causes the housing to rotate in a second direction opposite the first direction when the cord is pulled in the direction away from the housing.

In accordance with a third aspect of the present disclosure, which may be used in combination with any other aspect or combination of aspects listed herein, the housing is rotated about an axis in the direction that the at least one cord is pulled.

In accordance with a fourth aspect of the present disclosure, which may be used in combination with any other aspect or combination of aspects listed herein, the item is at least one fluid, semi-fluid or solid, and rotation of the housing causes at least one of: (i) a single item to change a physical property; (ii) two or more items to be mixed together; or (iii) two or more items to be separated.

In accordance with a fifth aspect of the present disclosure, which may be used in combination with any other aspect or combination of aspects listed herein, the item is at least one of an egg or an egg-shaped food container.

In accordance with a sixth aspect of the present disclosure, which may be used in combination with any other aspect or combination of aspects listed herein, the housing includes a first outer shell and a second outer shell, the first outer shell configured to attach to the second outer shell around the item.

In accordance with a seventh aspect of the present disclosure, which may be used in combination with any other aspect or combination of aspects listed herein, the housing includes at least one inner shell including a cavity that is an approximate shape of the item.

In accordance with an eighth aspect of the present disclosure, which may be used in combination with any other aspect or combination of aspects listed herein, the at least one cord is two cords attached to opposite sides of the housing, and the housing is configured to rotate when the two cords are pulled in opposite directions away from the housing.

In accordance with a ninth aspect of the present disclosure, which may be used in combination with any other aspect or combination of aspects listed herein, a mixing device includes a first side including a first outer shell and a first cord attached to the first outer shell, a second side including a second outer shell and a second cord attached to the second outer shell, and an attachment mechanism for attaching the first outer shell to the second outer shell. The first outer shell and the second outer shell are configured to rotate when the first cord and the second cord are pulled in opposite directions away from the first outer shell and the second outer shell.

In accordance with a tenth aspect of the present disclosure, which may be used in combination with any other aspect or combination of aspects listed herein, the attachment mechanism is formed as part of at least one of the first outer shell and the second outer shell.

In accordance with an eleventh aspect of the present disclosure, which may be used in combination with any other aspect or combination of aspects listed herein, the first outer shell and the second outer shell are configured to rotate about an axis defined by the opposite pulling directions of the first cord and the second cord.

In accordance with a twelfth aspect of the present disclosure, which may be used in combination with any other aspect or combination of aspects listed herein, at least one of the first side and the second side includes an inner shell with a cavity that is an approximate shape of an item to be placed inside the cavity.

In accordance with a thirteenth aspect of the present disclosure, which may be used in combination with any other aspect or combination of aspects listed herein, the mixing device includes a plurality of interchangeable inner shells that can be removeably attached to at least one of the first outer shell and the second outer shell.

In accordance with a fourteenth aspect of the present disclosure, which may be used in combination with any other aspect or combination of aspects listed herein, a method of mixing food includes placing an item inside of a housing, rotating the housing in a first direction to create tension, and releasing the tension so that the housing rotates in a second direction and mixes the item.

In accordance with a fifteenth aspect of the present disclosure, which may be used in combination with any other aspect or combination of aspects listed herein, rotating the housing in the first direction includes twisting at least one cord attached to the housing to create the tension.

In accordance with a sixteenth aspect of the present disclosure, which may be used in combination with any other aspect or combination of aspects listed herein, releasing the tension includes pulling the at least one cord in a direction away from the housing.

In accordance with a seventh aspect of the present disclosure, which may be used in combination with any other aspect or combination of aspects listed herein, releasing the tension includes rotating the housing in the second direction about an axis in the direction that the at least one cord is pulled away from the housing.

In accordance with a eighteenth aspect of the present disclosure, which may be used in combination with any other aspect or combination of aspects listed herein, releasing the tension includes pulling two cords in opposite directions away from the housing.

In accordance with a nineteenth aspect of the present disclosure, which may be used in combination with any other aspect or combination of aspects listed herein, releasing the tension includes rotating the housing in the second direction opposite the first direction.

In accordance with a twentieth aspect of the present disclosure, which may be used in combination with any other aspect or combination of aspects listed herein, placing the item inside of the housing includes attaching a first shell of the housing and a second shell of the housing around the item.

The invention is claimed as follows:

1. A mixing device, comprising: a housing, wherein the housing is comprised of two housing halves wherein each housing half possesses a rigid exterior and an elastomer lined interior and when each housing half is securely attached to each other provides a cavity having the profile of an egg and wherein the elastomer lined interior of each housing half has at least one elastomer projection for cushioning and supporting an egg in the cavity; and at least one cord attached to the housing, wherein the at least one cord is configured to cause the housing to rotate when the at least one cord is pulled in a direction away from the housing.

2. The mixing device of claim 1, wherein the housing is configured to be rotated in a first direction to place tension on the cord, and wherein the at least one cord causes the housing to rotate in a second direction opposite the first direction when the cord is pulled in the direction away from the housing.

3. The mixing device of claim 1, wherein the housing is rotated about an axis in the direction that the at least one cord is pulled.

4. The mixing device of claim 1, wherein the cavity is designed to hold an item that is at least one fluid, semi-fluid or solid, and wherein rotation of the housing causes at least one of: (i) a single item to change a physical property; (ii) two or more items to be mixed together; or (iii) two or more items to be separated.

5. The mixing device of claim 1, wherein the cavity is designed to hold an egg-shaped food container.

6. The mixing device of claim 1, wherein the housing includes a first outer shell and a second outer shell, the first outer shell configured to attach to the second outer shell around the item.

7. The mixing device of claim 1, wherein the housing includes at least one inner shell including a cavity that is an approximate shape of the item.

8. The mixing device of claim 1, wherein the at least one cord is two cords attached to opposite sides of the housing, and wherein the housing is configured to rotate when the two cords are pulled in opposite directions away from the housing.

9. A mixing device, comprising: a first side including a first outer shell and a first cord attached to the first outer shell; a second side including a second outer shell and a second cord attached to the second outer shell; and an attachment mechanism for attaching the first outer shell to the second outer shell, wherein the first outer shell and the second outer shell are configured to rotate when the first cord and the second cord are pulled in opposite directions away from the first outer shell and the second outer shell, wherein the first outer shell and second outer shell become securely attached to each other and thereby provide a cavity having the profile of an egg and possess at least one elastomer projection for cushioning and supporting an egg in the cavity.

10. The mixing device of claim 9, wherein the attachment mechanism is formed as part of at least one of the first outer shell and the second outer shell.

11. The mixing device of claim 9, wherein the first outer shell and the second outer shell are configured to rotate about an axis defined by the opposite pulling directions of the first cord and the second cord.

12. The mixing device of claim 9, wherein at least one of the first side and the second side includes an inner shell with a cavity that is an approximate shape of an item to be placed inside the cavity.

13. The mixing device of claim 9, wherein the mixing device includes a plurality of interchangeable inner shells that can be removeably attached to at least one of the first outer shell and the second outer shell.

\* \* \* \* \*